US008411172B2

(12) United States Patent
Kurokawa

(10) Patent No.: US 8,411,172 B2
(45) Date of Patent: Apr. 2, 2013

(54) IMAGING DEVICE AND IMAGE PROCESSING APPARATUS

(75) Inventor: Mitsuaki Kurokawa, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 183 days.

(21) Appl. No.: 13/094,080

(22) Filed: Apr. 26, 2011

(65) Prior Publication Data

US 2011/0199494 A1 Aug. 18, 2011

Related U.S. Application Data

(62) Division of application No. 12/201,534, filed on Aug. 29, 2008, now Pat. No. 7,956,899.

(30) Foreign Application Priority Data

Aug. 29, 2007 (JP) ................................ 2007-223105
Sep. 14, 2007 (JP) ................................ 2007-239282
Sep. 14, 2007 (JP) ................................ 2007-239283

(51) Int. Cl.
*H04N 5/217* (2011.01)
(52) U.S. Cl. .................................. 348/241; 348/208.99
(58) Field of Classification Search .................. 348/241, 348/208.99–208.14, 152, 155, 239
See application file for complete search history.

(56) References Cited

U.S. PATENT DOCUMENTS

| | | | |
|---|---|---|---|
| 7,847,823 B2 | 12/2010 | Habuka et al. | |
| 2003/0095189 A1* | 5/2003 | Liu et al. | 348/208.4 |
| 2008/0055432 A1* | 3/2008 | Koseki | 348/241 |
| 2008/0106609 A1 | 5/2008 | Kwon | |
| 2008/0151081 A1* | 6/2008 | Frank | 348/241 |

FOREIGN PATENT DOCUMENTS

| | | |
|---|---|---|
| JP | 1-142282 U | 9/1989 |
| JP | 06-319129 A | 11/1994 |
| JP | 09-065199 A | 3/1997 |
| JP | 10-013734 A | 1/1998 |
| JP | 2002-010106 A | 1/2002 |
| JP | 2004-228644 A | 8/2004 |
| JP | 2005-175886 A | 6/2005 |

(Continued)

OTHER PUBLICATIONS

Notice of Grounds for Rejection dated Jan. 10, 2012, issued in corresponding Japanese Patent Application No. 2007-239282.

(Continued)

*Primary Examiner* — Tuan Ho
(74) *Attorney, Agent, or Firm* — Westerman, Hattori, Daniels & Adrian, LLP

(57) ABSTRACT

An imaging device includes an imager, with which an optical image of an object scene is repetitively captured. A first movement detector detects, as to each of a plurality of object scene images according to a time series output from the imager, a movement of a first feature point between the object scene image and the object scene images immediately before, and a clipper performs clipping processing on each of the plurality of object scene images on the basis of the detection result. When a still image recording operation is performed, a CPU changes an exposure time of the imager in such a direction as to shorten the time, and a second movement detector detects a movement of a second feature point between the object scene image immediately after the recording operation (reference object scene image) and the three object scene images being successive thereto out of a plurality of object scene images, and an adder adds the respective three object scene images to the reference object scene image while displacing the same on the basis of the detection result.

30 Claims, 22 Drawing Sheets

FOREIGN PATENT DOCUMENTS

| | | |
|---|---|---|
| JP | 2006-033232 A | 2/2006 |
| JP | 2006033232 A | 2/2006 |
| JP | 2006-060628 A | 3/2006 |
| JP | 2006060628 A | 3/2006 |
| JP | 2006-197455 A | 7/2006 |
| JP | 2006197455 A | 7/2006 |
| JP | 2006-237716 A | 9/2006 |
| JP | 2006-246270 A | 9/2006 |
| JP | 2006237716 A | 9/2006 |
| JP | 2006246270 A | 9/2006 |
| JP | 2006-311058 A | 11/2006 |
| JP | 2007-060449 A | 3/2007 |
| JP | 2007-110636 A | 4/2007 |

OTHER PUBLICATIONS

Notice of Grounds for Rejection dated Dec. 20, 2011, issued in corresponding Japanese Patent Application No. 2007-223105.
Japanese Office Action dated May 24, 2011, issued in corresponding Japanese Patent Application No. 2007-223105.
Japanese Office Action dated May 31, 2011, issued in corresponding Japanese Patent Application No. 2007-239283.

* cited by examiner

FIG. 2
(A)
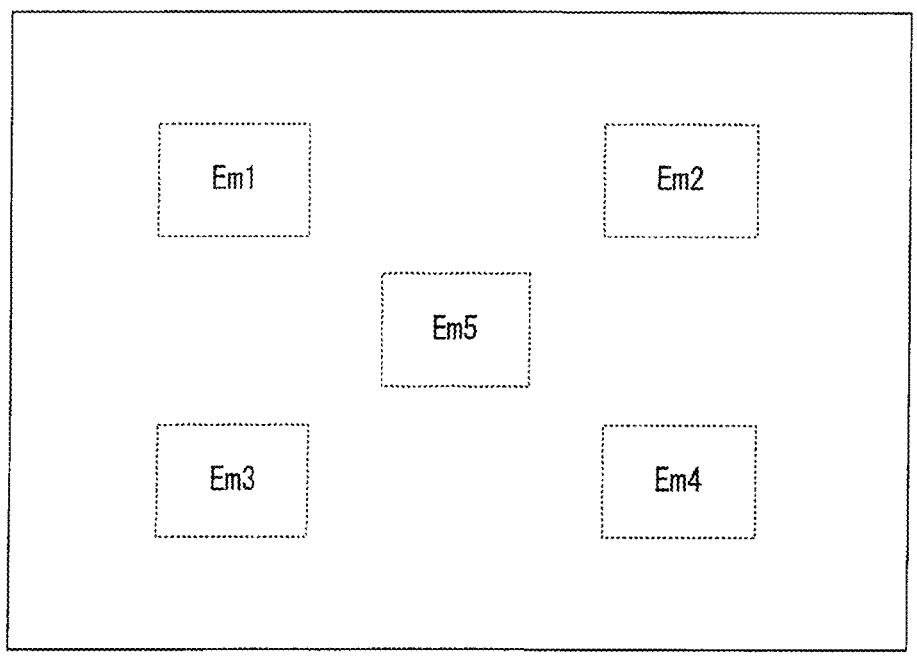
(B)
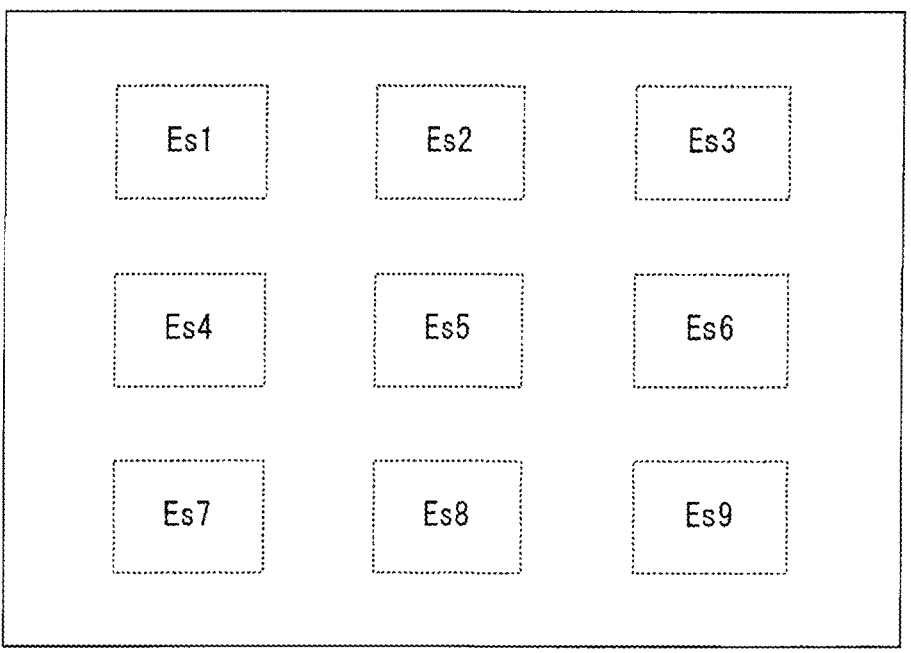

| k+1 : k (MOVEMENT VECTOR OF "k+1" WITH RESPECT TO "k") |
|---|
| k+2 : k+1 |
| k+3 : k+2 |
| k+4 : k+3 |

(B)

R2

| (k+1) : k (MOVEMENT VECTOR OF "k+1" WITH RESPECT TO "k") |
|---|
| (k+2) : k |
| (k+3) : k |

FIG. 12
(A) 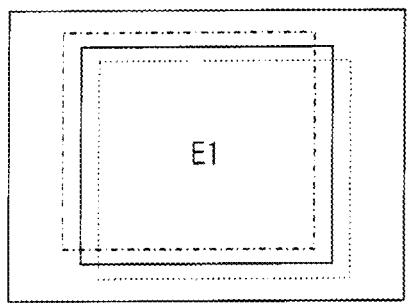
(B) 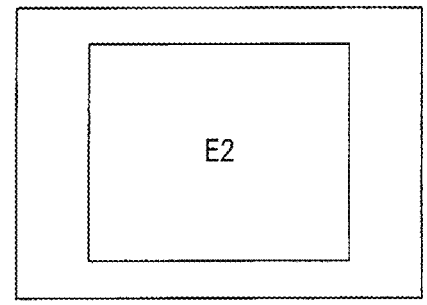
FIG. 13
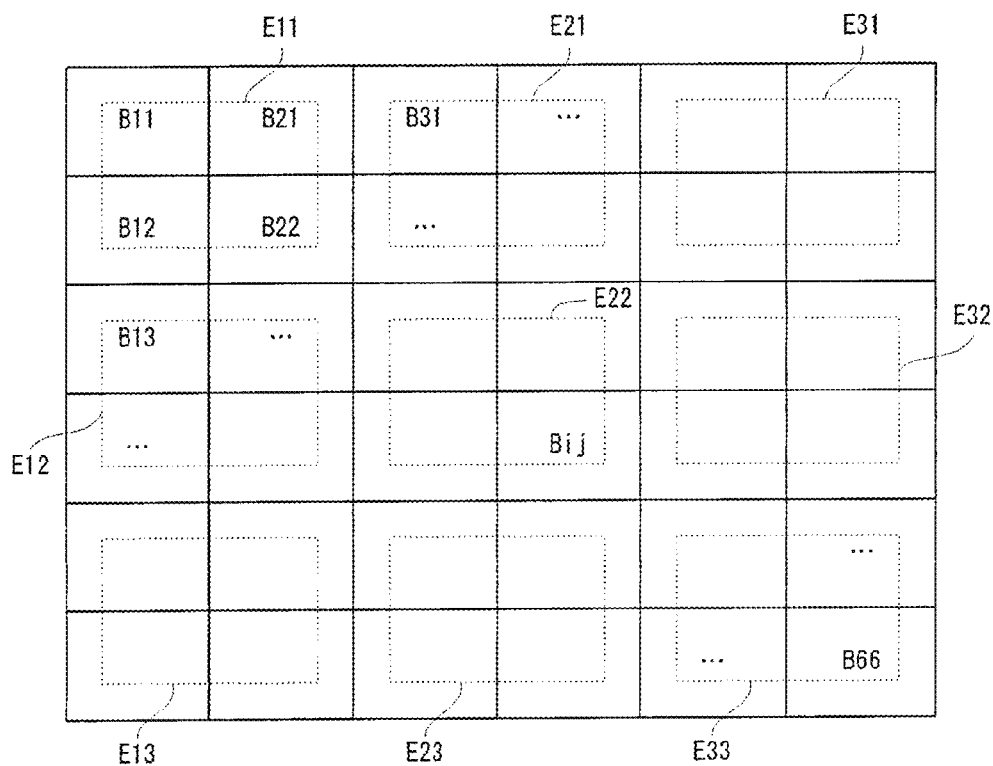

IMAGING DEVICE AND IMAGE PROCESSING APPARATUS

CROSS-REFERENCE OF RELATED APPLICATIONS

This application is a Divisional of application Ser. No. 12/201,534, filed Aug. 29, 2008, which claims priority of Japanese Patent Application Nos. 2007-223105, 2007-239282 and 2007-239283, the contents of which are incorporated herein by reference.

BACKGROUND OF THE INVENTION

1. Field of the Invention

The present invention relates to an imaging device and an image processing apparatus. More specifically, the present invention relates to an imaging device which electronically performs a camera shake correction, and an image processing apparatus which performs image processing, such as a camera shake correction, a noise reduction, etc. on a plurality of object scene images according to a time series that are captured by the image sensor.

2. Description of the Related Art (I) In relation to imaging devices of such a kind, in one related art, a still image is produced by displacing a plurality of images being continuous according to a time series and adding them to each other. In another related art, a motion image is produced by displacing and clipping a part out of each of the plurality of object scene images being continuous according to a time series.

In general, in an actual imaging device, such as a digital camera, etc., it is required to shoot both of the motion images and the still images with high image quality. However, even if the related arts are merely combined, it is difficult to shoot both of the motion images and still images with a proper exposure amount by accurately using two kinds of camera shake correction for motion image and still image.

(II) With respect to the image processing apparatus of such a kind, in one related art, by displacing and cutting a part from each of a plurality of object scene images being continuous according to a time series, a motion image with small movement among the object scene images due to a camera shake (movement component in a time axis direction) is produced. In another related art, a data for correction to correct an FPN (Fixed Pattern Noise) of the image sensor is stored in a memory, and a correction processing unit performs on the object scene image output from the image sensor FPN correction processing on the basis of the data for correction. In a still another related art, by displacing a plurality of object scene images being continuous according to a time series and making an addition to each other, it is possible to suppress a random noise of each object scene image (3DDNR: Three-Dimensional Digital Noise Reduction).

Generally, in an actual image processing apparatus, such as a digital movie camera, etc., a movement due to a hand shake, a random noise and an FPN are required to be suppressed. However, merely combining the related arts with each other requires more memory and increases power consumption.

(III) Out of the image processing apparatuses of this kind, with respect to the one performing a 3DDNR, in one related art, by displacing a plurality of object scene images being continuous according to a time series and performing a weighted addition on them, a random noise of each object scene image is suppressed. In making the weighted addition, a coefficient to be multiplied by each object scene image is changed depending on the magnitude of the movement among the object scene images. The magnitude of the movement among the object scene images is determined in unit of the object scene image (frame or field). In another related art, the magnitude of the movement is determined in unit of the pixel, and the 3DDNR is performed on only the part with small movement within each object scene image.

However, in the former related art, in a case that an object (hit ball, etc.) which is smaller in size and quickly moves is included in the object scene, the image at the object portion is blurred due to the 3DDNR. On the other hand, in the latter related art, the 3DDNR is performed only on the part with small movement, and therefore, the blur at the portion with large movement is avoided, but the dimension of the movement is determined by the unit of pixels, resulting in an enormous amount of throughputs.

SUMMARY OF THE INVENTION

The present invention employs following features in order to solve the above-described problems. It should be noted that reference numerals inside the parentheses and the supplements show one example of a corresponding relationship with the embodiments described later for easy understanding of the present invention, and do not limit the present invention.

A first invention is an imaging device, comprising: an imager for repetitively capturing an optical image of an object scene; a first movement detector for detecting, as to each of a plurality of object scene images according to a time series output from the imager, a movement of a first feature point between the object scene image and one or plurality of first proximate object scene images temporally proximate to the object scene image; a clipper for performing clipping processing on each of the plurality of object scene images on the basis of the detection result by the first detector; a changer for changing an amount of the exposure to the imager in a such a direction as to reduce the amount in response to a still image recording operation; a second movement detector for detecting a movement of a second feature point between a reference object scene image and one or plurality of second proximate object scene images temporally proximate to the reference object scene image out of a plurality of object scene images according to a time series that is output from the imager after execution of the changing processing by the changer; and a first adder for adding each of said one or a plurality of second proximate object scene images to said reference object scene images while displacing the same on the basis of the detection result by the second movement detector.

In an imaging device (10) of the first invention, an optical image of an object scene is repetitively captured by an imager (14). A first movement detector (26) detects, as to each of a plurality of object scene images according to a time series output from the imager, a movement of a first feature point between the object scene image and one or plurality of first proximate object scene images temporally proximate to the object scene image (upper part in FIG. 3), and a clipper (22) performs clipping processing on each of the plurality of object scene images on the basis of the detection result by the first detector. Thus, it is possible to obtain an object scene image for motion image in which a movement in a time axis direction (that is, movement among the frames) due to a hand shake is suppressed.

When a still image recording operation is performed, a changer (30) changes an amount of the exposure to the imager in such a direction as to reduce the amount (S3), a second movement detector (28) detects a movement of a second feature point between a reference object scene image and one or plurality of second proximate object scene images temporally proximate to the reference object scene image out of a plurality of object scene images according to a time series that is output from the imager after execution of the changing processing by the changer (lower part in FIG. 3), and a first adder (32) displaces each of the one or plurality of second proximate object scene images on the basis of the detection result by the second movement detector and adding the same to the reference object scene image. Thus, it is possible to obtain an object scene image for still image in which a movement among the frames due to the hand shake is suppressed and an excessive exposure due to the addition is reduced.

Here, the reduction in the amount of the exposure is realized by changing an exposure time in such a direction as to shorten the time, and changing the aperture in such a direction as to close the aperture. In either case, the movement among the frames due to the hand shake is reduced, but in the former case, especially, if the exposure time is shortened to 1/N times, the movement among the frames becomes 1/N times. On the contrary thereto, in the latter case, the effect of the reduction is obtained since the movement component has a property as a random noise, but the movement component is not a complete random noise, and therefore, the effect of the reduction in the latter case falls short of that in the former case.

A second invention is an image processing apparatus for performing image processing on a plurality of object scene images according to a time series that are output from an imager for repetitively capturing an optical image of an object scene, comprising: an FPN corrector for performing FPN correction processing on the plurality of object scene images; a movement detector for detecting a movement of a feature point among the plurality of object scene images; a first clipper for performing clipping processing on each of the plurality of object scene images at a position based on the detection result by the movement detector; an adder for performing adding processing of adding to each of the plurality of object scene images after the first clipper, one or plurality of object scene images temporally proximate to the object scene image; a first determiner for repetitively determining whether or not the movement detected by the movement detector is above a threshold value; and a first controller for making the FPN corrector invalid when the determination result by the first determiner is affirmative and making the FPN corrector valid when the determination result by the first determiner is negative.

In the second invention, an optical image of an object scene is repetitively captured by an imager (114), and a plurality of object scene images according to a time sequence that are output from the imager are applied to the image processing apparatus (100, 100A).

In the image processing apparatus, an FPN corrector (118a) performs FPN correction processing on the plurality of object scene images, and a movement detector (122) detects a movement of a feature point among the plurality of object scene images. A first clipper (126) performs clipping processing at a position based on the detection result by the movement detector on each of the plurality of object scene images. That is, the clipping position of the first clipper moves according to the movement of the feature point. Thus, by making the clipping position follow the movement of the feature point, it is possible to reduce the movement among the plurality of object scene images.

Then, an adding processing of adding to each of the plurality of object scene images after the first clipper, one or plurality of object scene images temporally proximate to the object scene image is performed by an adder (128, 128A). Thus, it is possible to reduce the random noise included in each of the plurality of object scene images.

On the other hand, a first determiner (S105) repetitively determines whether or not the movement detected by the movement detector is above a threshold value. A first controller (S107, S109) makes the FPN corrector invalid when the determination result by the first determiner is affirmative and making the FPN corrector valid when the determination result by the first determiner is negative.

Accordingly, while the movement is above the threshold value, the FPN corrector is made invalid, capable of reducing power consumption. Thus, even if the FPN corrector is made invalid, the FPN is suppressed by the clipping processing by the first clipper and the adding processing by the adder at the back thereof. The reason why is because by moving the clipping position, the FPN has a property as a random noise as a result, and can be reduced by the adder.

A third invention is an image processing apparatus for performing image processing on a plurality of object scene images according to a time series that are output from an imager for repetitively capturing an optical image of an object scene, comprising: a movement detector for detecting a movement of a feature point among the plurality of object scene images; a first clipper for performing clipping processing on each of the plurality of object scene images at a position based on the detection result by the movement detector; and an adder for performing adding processing of adding to each of the plurality of object scene images after the first clipper, one or plurality of object scene images temporally proximate to the object scene image, wherein the adder includes a divider for dividing a pair of object scene images to be added with each other into a common partial image, and a weighted adder for weighing the division result by the divider with a coefficient for each common partial image and adding the results to each other.

In the third invention, an optical image of an object scene is repetitively captured by an imager (114), and a plurality of object scene images according to a time sequence that are output from the imager are applied to the image processing apparatus (100, 100A).

In the image processing apparatus, a movement detector (122) detects a movement of a feature point among the plurality of object scene images, and a first clipper (126) performs clipping processing on each of the plurality of object scene images at a position based on the detection result by the movement detector. That is, the clipping position of the first clipper moves according to the movement of the feature point. Thus, by making the clipping position follow the movement of the feature point, it is possible to reduce the movement among the plurality of object scene images.

Each of the plurality of object scene images after the first clipper is applied to the adder (128, 128A) so as to be subjected to adding processing of adding one or plurality of object scene images temporally proximate to the object scene image. By thus adding the proximate object scene images, it is possible to suppress the random noise included in each of the plurality of object scene images.

In addition, by arranging an adder at the back of the first clipper, it is possible to also suppress the FPN. By moving the clipping position, the FPN has a property as a random noise, and such a noise component is also suppressed by the adder.

Furthermore, in the adder, a divider (150a, 150b, 152a, 152b) divides a pair of the object scene images to be added with each other into a common partial image (B11-B66), and a weighted adder (154a, 154b, 156) weighs the division result by the divider with a coefficient for each common partial image and adds the results to each other. By determining the coefficient for weighting for a common partial image, it is possible to avoid a blur at a part with the large movement.

Here, the common partial image may be a single pixel or blocks of m pixels×n pixels (m, n are integers equal to or more than one), but by properly selecting the size of the common partial image (about several pixels×several pixels), it is possible to suppress the throughput for deciding the coefficient.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2(A) is an illustrative view showing a movement detecting area for motion image applied to the first embodiment;

FIG. 2(B) is an illustrative view showing a movement detecting area for still image applied to the first embodiment;

FIG. 4(A) is an illustrative view showing a memory map of a memory for motion image at a certain time;

FIG. 4(B) is an illustrative view showing a memory map of a memory for still image at the same time as FIG. 4(A);

FIG. 12(A) is an illustrative view showing a clipping area of a first clipping circuit;

FIG. 12(B) is an illustrative view showing a clipping area of a second clipping circuit;

FIG. 13 is an illustrative view showing a correspondence between detection areas of a movement detection circuit and divided blocks of a 3DDNR circuit;

DETAILED DESCRIPTION OF THE PREFERRED EMBODIMENTS

First Embodiment

Figure 1:
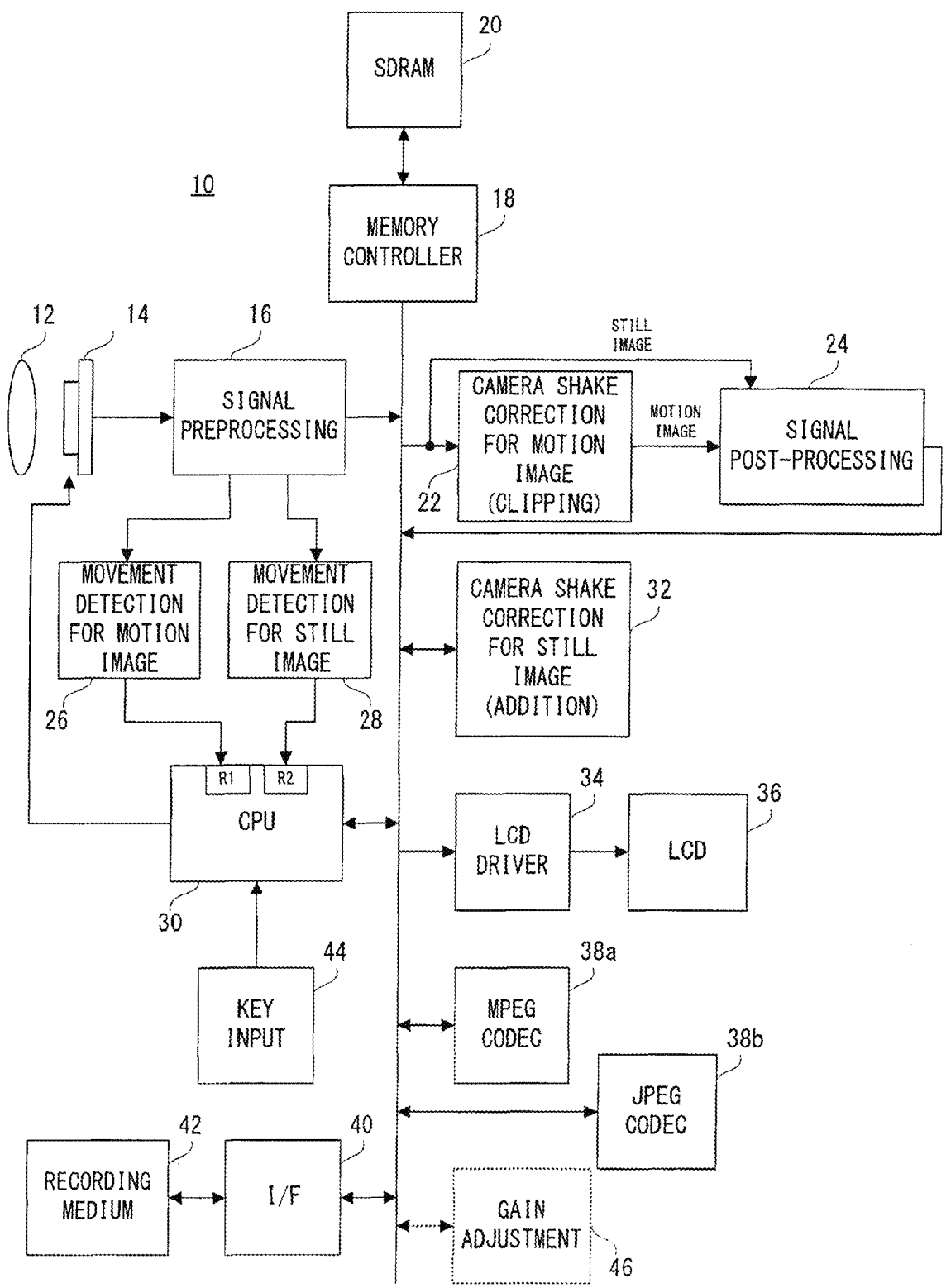
FIG. 1 is a block diagram showing a configuration of a first embodiment of the present invention.

Referring to FIG. 1, a digital camera 10 according to this embodiment includes an image sensor 14. An optical image of an object scene passing through an optical lens 12 is irradiated onto an acceptance surface, that is, an imaging surface of the image sensor 14 on which electric charges corresponding to the optical image of the object scene, that is, a raw image signal is generated by photoelectronic conversion.

When a real-time motion image of the object scene, that is, a through-image is displayed on an LCD monitor 36, the CPU 30 instructs the image sensor 14 to repetitively perform an exposure and a reading. The image sensor 14 repetitively executes an exposure over an exposure time T and reading a raw image signal thus generated at a cycle of 1/60 seconds, for example. A raw image signal corresponding to the optical image of the object scene is output from the image sensor 14.

Figure 5:
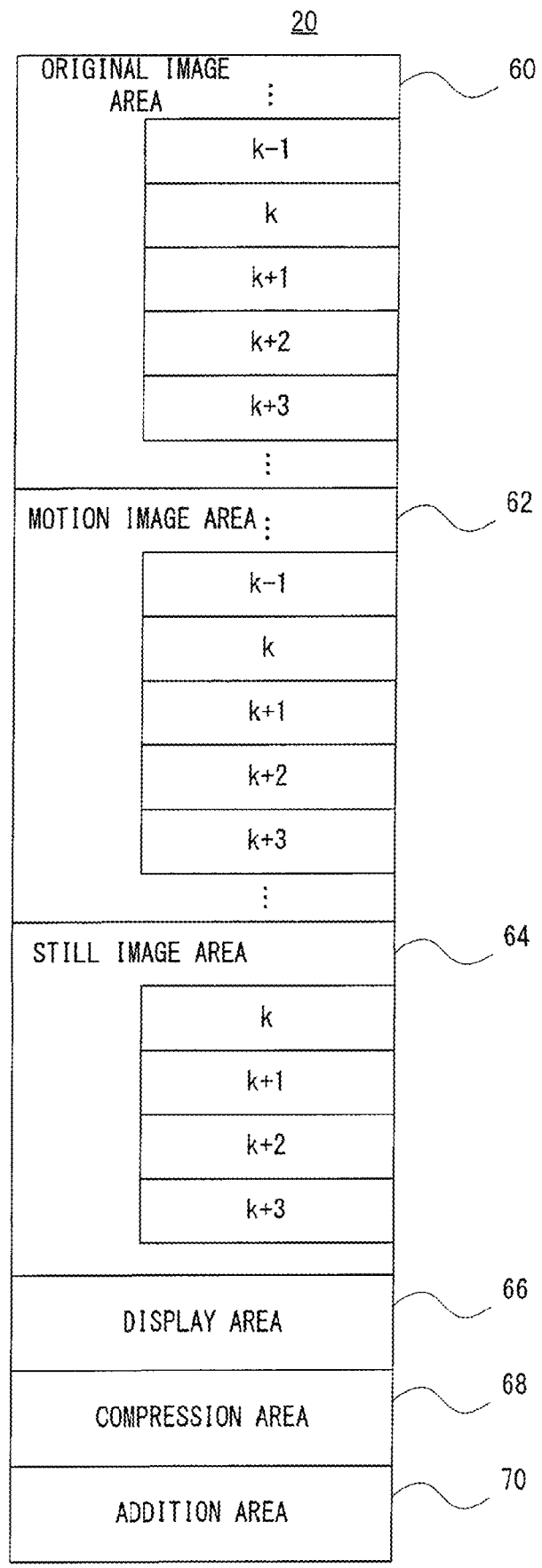
FIG. 5 is an illustrative view showing a memory map of an SDRAM at the same time as FIG. 4(A)

The output raw image signal is subjected to preprocessing such as an A/D conversion, a noise reduction, a clamp, a pixel defect correction, etc. by a signal preprocessing circuit 16. The original image data thus produced is written to an original image area 60 (see FIG. 5) within an SDRAM 20 through a memory controller 18.

The original image area 60 includes a plurality of banks (60 here) each having a capacity of one frame of an original image, and the memory controller 18 writes the original image data to these banks by one frame. At this time, the CPU 30 applies a frame number (1, 2, ..., k, ...) to each frame. After completion of writing to the last bank, similar writing processing is repeated from the first bank again. Thus, the original image area 60 always stores 60 frames in the immediate vicinity of the current frame.

The original image data generated by the signal preprocessing circuit 16 is also applied to a movement detecting circuit for motion image 26 and a movement detecting circuit for still image 28. Each of the movement detecting circuit for motion image 26 and the movement detecting circuit for still image 28 detects a movement vector on the basis of the applied image data.

Here, in the movement detecting processing for motion image and the movement detecting processing for still image, the number of detection areas assigned to the object scene is different between them. More specifically, the movement detecting circuit for motion image 26 assigns five detection areas Em1-Em5 to the object scene (see FIG. 2(A)) while the movement detecting circuit for still image 28 assigns nine detection areas Es1-Es9 to the object scene (see FIG. 2(B)).

Additionally, the movement detecting processing for motion image and the movement detecting processing for still image are different in a manner of the movement vectors to be detected and a period during which the detections are performed. That is, the movement detecting circuit for motion image 26 repetitively detects a movement of a feature point between the current frame and the frame immediately before during a through image/motion image recording.

On the contrary thereto, the movement detecting processing for still image is limited to a still image shooting period (see FIG. 6: described later) taking a time when the still image recording operation is performed as a starting point. That is, assuming that a frame immediately after the still image recording operation, that is, the "k"-th frame is taken as a reference frame, the movement detecting circuit for still image 28 detects a movement of a feature point between each of the three successive frames, that is, the "k+1"-th frame, the "k+2"-th frame and the "k+3"-th frame, and the reference frame.

The detection result of the movement detecting circuit for motion image 26 and the detection result of the movement detecting circuit for still image 28 are respectively written to a memory for motion image R1 and a memory for still image R2 that are included in the CPU 30 (see FIG. 4(A) and FIG. 4(B)).

The original image data stored in the original image area 60 is read by the memory controller 18, and applied to a camera shake correction circuit for motion image 22. On the other hand, the CPU 30 calculates a clipping position where the movement of the object scene image due to a camera shake is canceled out on the basis of the movement vector stored in the memory for motion image R1 for each frame, and notifies the position information indicating the calculation result to the camera shake correction circuit for motion image 22.

The camera shake correction circuit for motion image 22 executes clipping processing for clipping a part from the applied original image data on the basis of the notified clipping position information. Thus, a movement component in a time axis direction due to the hand shake is removed from the original image data. The original image data on which the camera shake correction for motion image is performed is applied to a signal post-processing circuit 24 as image data for through display/motion image recording (hereinafter referred to as "motion image data").

The signal post-processing circuit 24 performs post-processing such as a color separation, a gamma correction, a YUV conversion, a pixel count conversion, etc. on the applied motion image data. The pixel count conversion processing here includes first number of pixels converting processing for converting the number of pixels for motion image data to the number of pixels for through display (that is, the number of pixels corresponding to the resolution of the LCD monitor 36) and second number of pixels converting processing for converting the number of pixels for motion image data into the number of pixels for motion image recording (640×480, for example). Accordingly, the signal post-processing circuit 24 executes the first number of pixels converting processing and the second number of pixels converting processing in parallel (by time division, for example).

The motion image data on which the first number of pixels converting processing is performed is written to a display area 66 (see FIG. 5) within an SDRAM 20 through the memory controller 18. An LCD driver 34 reads the motion image data stored in the display area 66, and drives the LCD monitor 36 by the read motion image data. It should be noted that the display area 66 includes two banks (not shown) each having a capacity of one frame of a through-image, and writing processing to one bank is performed in parallel with reading processing from the other bank. Thus, a through-image of the object scene is displayed on the monitor screen.

The motion image data on which the second number of pixels converting processing is performed is written to a motion image area 62 within the SDRAM 20 through the memory controller 18. The motion image area 62 includes a plurality of banks (60, here) each having a capacity of one frame of a motion image, and motion image data is written to these banks by one frame. After completion of writing to the last bank, similar writing processing is repeated from the first bank again. Thus, the motion image area 62 always stores 60 frames in the immediate vicinity of the current frame.

The Y data out of the image data for through display output from the signal post-processing circuit 24 is also applied to the CPU 30 for an exposure control. The CPU 30 adds up the applied Y data to generate a luminance evaluation value, and adjusts an exposure time T of the image sensor 14 on the basis of the generated luminance evaluation value.

When a motion image record starting operation is performed with a key input device 44 thereafter, that is, during a through display, the CPU 30 issues a compression instruction to an MPEG codec 38a and opens an MPEG file as a writing destination of the compressed motion image within the recording medium 42. The MPEG codec 38a reads the motion image data by a predetermined amount (15 frames, for example) from the motion image area 62 within the SDRAM 20 through the memory controller 18, and compresses the read motion image data in an MPEG system. The compressed motion image data output from the MPEG codec 38a is written to a compression area 68 (see FIG. 5) within the SDRAM 20 through the memory controller 18.

The CPU 30 then reads the compressed motion image data stored in the compression area 68 by the predetermined amount, and writes the read compressed image data in an opened MPEG file through an I/F 40.

When a still image record starting operation is performed with the key input device 44 thereafter, that is, during the motion image recording, the destination for supplying the image data read from the original image area 60 is changed from the camera shake correction circuit for motion image 22 to the signal post-processing circuit 24. However, the changed state is released after the still image shooting period (see FIG. 6: described later) elapses.

Accordingly, assuming that the frame number immediately after the still image recording operation is "k", image data at the k-th to the (k+3)-th frames are directly applied to the signal post-processing circuit 24 as image data for still image recording (hereinafter referred to as "still image data") without passing through the camera shake correction circuit for motion image 22.

The image data for still image recording is also subjected to a similar post-processing by the post-processing circuit 24, but the pixel count conversion processing here is third number of pixels converting processing for converting the number of pixels of the image data into the number of pixels for still image recording (1600×1200, for example). Thus, during the still image shooting period, in addition to the first number of pixels converting processing and the second number of pixels converting processing with respect to the motion image data, the third number of pixels converting processing with respect to the still image data is executed in parallel.

The image data for still image recording output from the signal post-processing circuit 24 is written to a still image area 64 within the SDRAM 20 through the memory controller 18. The still image area 64 includes four banks each having a capacity of one frame of the still image, and in each bank, one frame of image data is written. Thus, the still image area 64 stores four frames of image data immediately after the still image recording operation.

On the other hand, the CPU 30 changes the exposure time T of the image sensor 14 to "T/4" in response to the still image recording operation, and then issues a correction instruction to a camera shake correction circuit for still image 32.

The camera shake correction circuit for still image 32 first calculates each of the amount of displacements ($\Delta 1$, $\Delta 2$ and $\Delta 3$) of each of the (k+1)-th frame, the (k+2)-th frame, and the (k+3)-th frame with respect to the k-th frame on the basis of the movement vector stored in the memory for still image R2. Next, the still image data at the k-th to the (k+3)-th frames are read from the still image area 64 within the SDRAM 20 through the memory controller 18. Next, the read still image data at the (k+1)-th to the (k+3)-th frames are subjected to displacing processing on the basis of the calculated displacement information. Then, the still image data at the (k+1)-th to the (k+3)-th frames after the displacing processing is successively added to the read image data at the k-th frame.

By the addition processing, it is possible to obtain the still image data with less blurring of image due to the hand shake and appropriate brightness. It should be noted that in the addition, a coefficient ($\alpha 0$-$\alpha 3$) may be multiplied by the still image data of each frame (weighted addition).

The result of the aforementioned addition, that is, the still image data output from the camera shake correction circuit for still image 32 is written to an addition area 70 (see FIG. 5) within the SDRAM 20 through the memory controller 18. It should be noted that the post-processing may be performed not on the still image data to be added as described above, but on the added still image data stored in the addition area 70.

The CPU 30 then issues a compression instruction to the JPEG codec 38b while opening a JPEG file as a writing destination of the compressed still image within the recording medium 42. The JPEG codec 38b reads the still image data from the addition area 70 within the SDRAM 20 through the memory controller 18, and compresses the read still image data in a JPEG system. The compressed still image data output from the JPEG codec 38b is written to the compression area 68 (see FIG. 5) within the SDRAM 20 through the memory controller 18.

The CPU 30 then reads the compressed still image data stored in the compression area 68, and writes the read compressed still image data to the opened JPEG file through the I/F 40. It should be noted that such a still image recording can be performed not only during the motion image recording but also during the through image displaying.

When a motion image record stopping operation is performed by the key input device 44 thereafter, that is, during the motion image recording, the CPU 30 issues a stop instruction to the MPEG codec 38a. After completion of writing the compressed image data, the MPEG file is closed.

Figure 6:
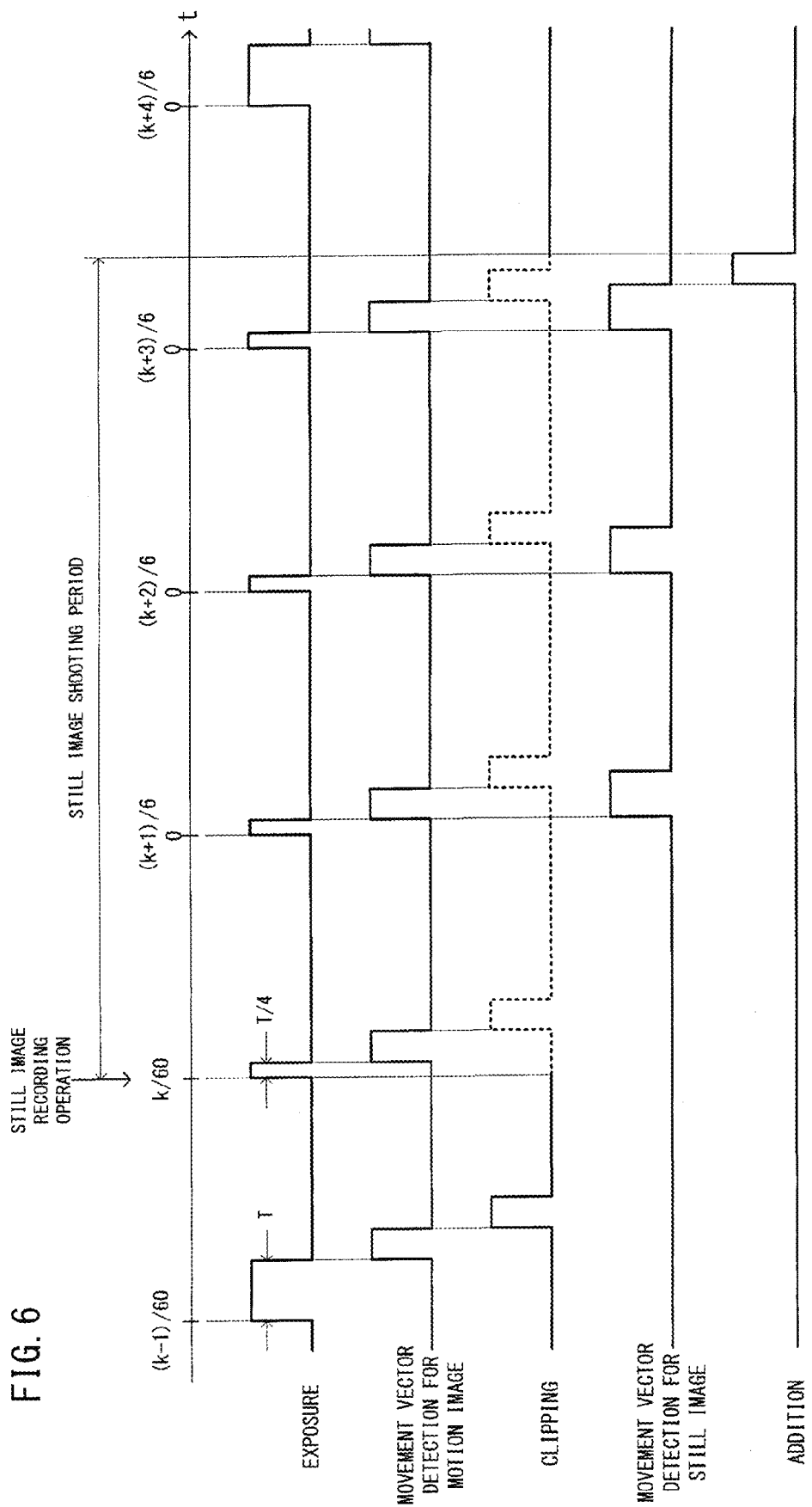
FIG. 6 is a timing chart showing an operation of the first embodiment.

The operation of the digital camera 10 as described above is according to a timing chart shown in FIG. 6. Referring to FIG. 6, the exposure by the image sensor 14 is performed at a fixed cycle (at a cycle of 1/60 seconds) in both of the through image/motion image recording and the still image recording. During the still image recording, that is, during a little over three frames (k/60$\leqq$t<(k+4)/60) from the time when the still image recording operation is performed, the exposure time is changed to 1/4 times shorter than that in the through image/motion image recording.

Figure 3:
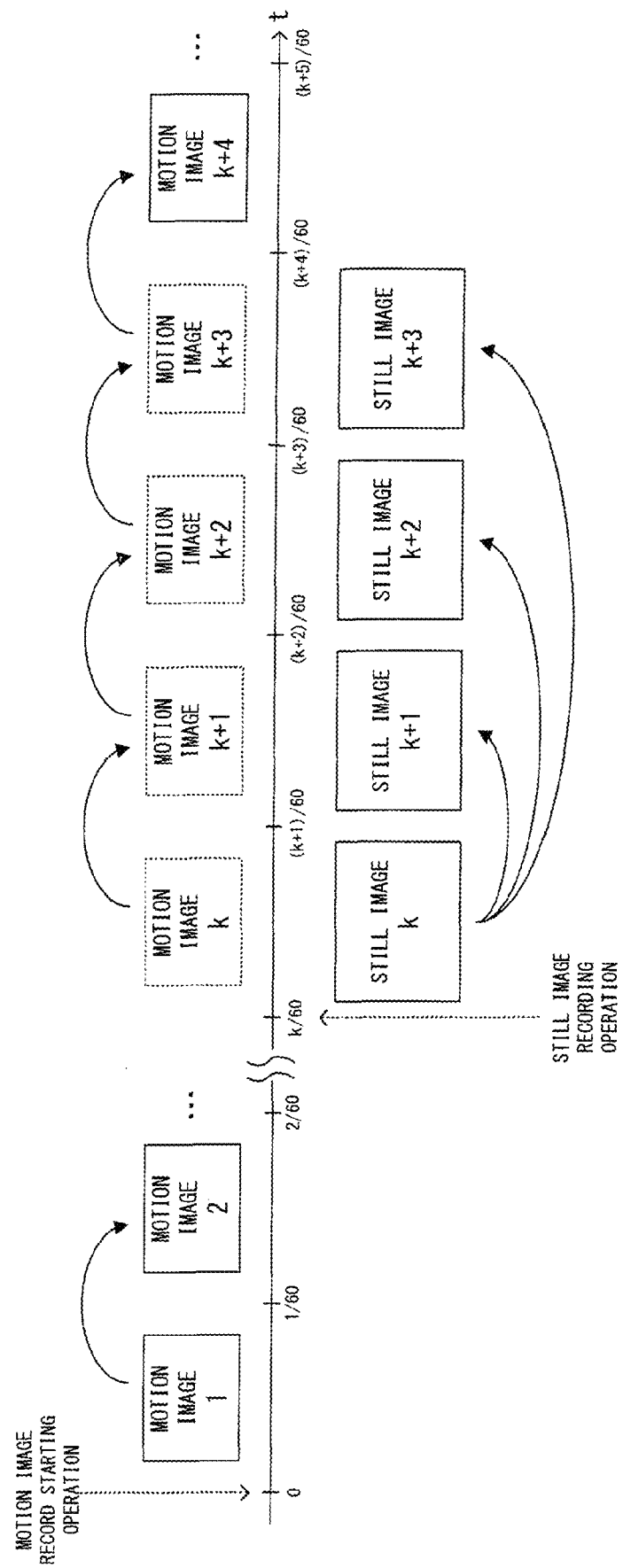
FIG. 3 is an illustrative view showing two kinds of image producing processing and two kinds of movement detecting processing along a time axis applied to the first embodiment.

The movement vector detection by the movement detecting circuit for motion image 26 is executed every time that an exposure by the image sensor 14 is completed, and the clipping by the camera shake correction circuit for motion image 22 is performed every time that the movement vector detection by the movement detecting circuit for motion image 26 is completed. At a time of the still image recording, the motion images "k"–"k+3" (see FIG. 3) are short of the amount of the exposure, and therefore, writing to a new image to the motion image area 62 may be interrupted and accordingly, the movement vector detection by the movement detecting circuit for motion image 26 may be suspended.

On the other hand, the movement vector detection for the movement detecting circuit for still image 28 is performed every time that the exposure for still image recording, specifically, when each of the latter three times out of the four times corresponding to the four exposures of t=k/60, (k+1)/60, (k+2)/60 and (k+3)/60 is completed. The addition by the camera shake correction circuit for still image 32 is performed at a time when a series of three movement vector detections by the movement detecting circuit for still image 28 is completed, that is, when the movement vector detection corresponding to t=(k+3)/60 is completed.

In addition, as understood from FIG. 6, for producing the still image for recording, at least the exposure time (=T/4), the movement vector detection time, and the addition time are required in addition to the period of three frames (=3/60 seconds), but each of these time periods is so short in comparison with the three frames of period that the still image can be produced during the period of a little over three frames (the period of a little over three frames is called "still image shooting period"). Thus, even if the writing of a new image to the motion image area 62 is interrupted during the still image shooting period, it has little effect on the image quality of the motion image.

However, by producing the motion image from the still image, the writing of a new image to the motion image area 62 may be continued even in recording the still image. More specifically, with reference to FIG. 3, an image for recording taking the still image "k" as a reference is produced, and three still images for recording taking the still images "k+1" to "k+3" as references are produced in a similar manner. Then, the pixel count conversion processing is performed on the four still images for recording "k" to "k+3" to thereby obtain motion images for through display/recording "k" to "k+3". Thus, even during the still image shooting period, it is possible to maintain the image quality of the motion images. Furthermore, if the gain adjustment processing is also performed in addition to the pixel count conversion processing, it is possible to produce motion images with more appropriate brightness.

Or, also during the still image shooting period, writing of a novel image to the motion image area 62 is continued, and gain-up processing equivalent to 4 times may be performed on the images stored in the motion image area 62. In this case, a gain adjustment circuit 46 shown by the dotted line in FIG. 1 is added to the digital camera 10.

Additionally, the movement detecting circuit for motion image 26 and the movement detecting circuit for still image 28 may be operated at least for one frame of period in parallel. This makes it possible to continue to freeze-display motion image frames corresponding to the still image in the still image shooting period.

Figure 7:
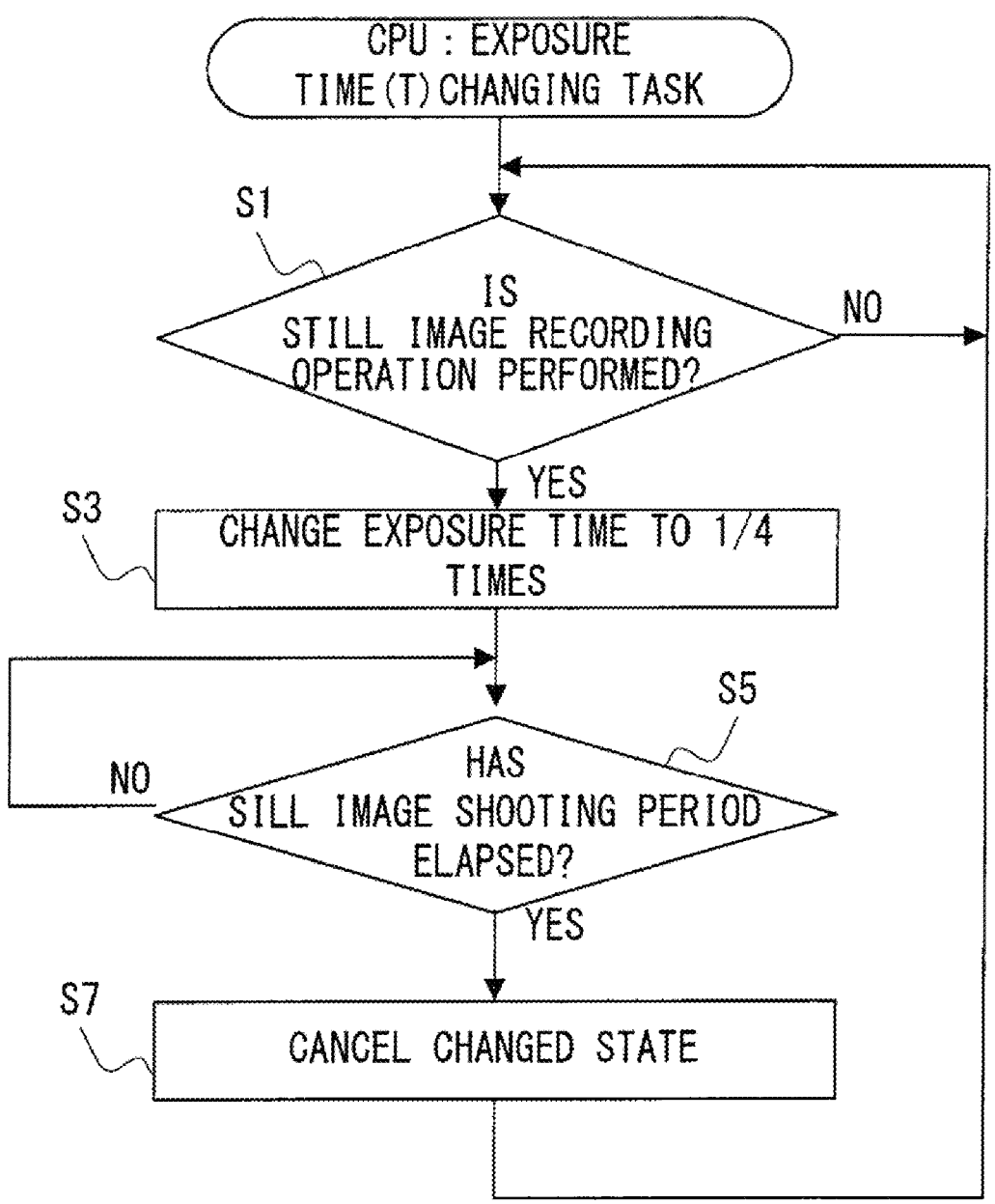
FIG. 7 is a flowchart showing a part of an operation of a CPU applied to the first embodiment.

The processing of changing the exposure time T out of the processing by the CPU 30 described above is according to an exposure time changing task shown in FIG. 7. Additionally, the CPU 30 can execute in parallel a plurality of tasks including the task shown in FIG. 7 under the control of the multi-tasking OS such as μITRON, etc.

Referring to FIG. 7, in a first step s1, it is determined whether or not a still image recording operation is performed, and if the determination result is "NO", a standby condition holds. When a still image recording operation is accepted by the key input device 44, "YES" is determined in the step S1, and the process shifts to a step S3. In the step S3, the exposure time T of the image sensor 14 is changed to 1/4 times.

In a next step S5, it is determined whether or not a still image shooting period (see FIG. 6) has elapsed since the still image recording operation was accepted, and if "NO", a standby condition holds. If the determination result in the step S5 is "YES", the process shifts to a step S7 to cancel the changed state. Thus, the exposure time of the image sensor 14 is restored from "T/4" to "T". Thereafter, the process returns to the step S1.

As understood from the above description, in this embodiment, the optical image of the object scene is repetitively captured by the image sensor 14. The movement detecting circuit for motion image 26 detects, as to each of a plurality of object scene images output from the image sensor 14, a movement of a feature point between the object scene image and the object scene image immediately before (see upper part of FIG. 3), and the camera shake correction circuit for motion image 22 performs clipping processing on each of the plurality of object scene images on the basis of the detection result of the movement detecting circuit for motion image 26. Thus, it is possible to obtain an object scene image for through display/motion image recording with less movement in the time axis direction (that is, the movement between the frames) due to the hand sake.

When the still image recording operation is performed, the CPU 30 changes the exposure time of the image sensor 14 in such a direction as to shorten the time (S3), the movement detecting circuit for still image 28 detects the movement of the feature point between the object scene image (reference object scene image) directly after the still image recording operation and each of the three successive object scene images out of the plurality of object scene images (see lower part of FIG. 3), and the camera shake correction circuit for still image 32 adds in order each of the three object scene images to the reference object scene image while displacing each of the three object scene images on the basis of the detection result of the movement detecting circuit for still image 28. Thus, it is possible to obtain an object scene image for still image that is reduced in movements among the frames due to the camera shake and an excessive exposure by the addition.

Because two kinds of camera shake corrections for motion image and for still image can properly be performed, it is possible to shoot both of still images and motion images with high image quality.

Furthermore, the movement detecting circuit for motion image 26 assigns the five detection areas Em1-Em5 to the object scene (see FIG. 2(A)) while the movement detecting circuit for still image 28 assigns the nine detection areas Es1-Es9 more than the above described five to the object scene (see FIG. 2(B)), and therefore, it is possible to perform a movement detection suitable for each of the motion image and the still image.

Additionally, the number of detection areas for motion image and the arrangement thereof are not restricted to those shown in FIG. 2(A), and the number of detection areas for still image and the arrangement thereof are not restricted to those shown in FIG. 2(B). Here, it is desirable that the detection areas for still image are arranged in a matrix with m rows and n columns (m is an integer equal to or more than three, and n is an integer equal to or more than three).

Moreover, in this embodiment, the movement detecting circuit for motion image 26 detects the movement of the feature point between the current frame and the frame immediately before, and the camera shake correction circuit for motion image 22 performs clipping on the basis of the detection result. However, after the detecting processing by the movement detecting circuit for motion image 26, the CPU 30 predicts the movement of the feature point between the current frame and the frame immediately after on the basis of the detection result, and the camera shake correction circuit for motion image 22 may perform clipping on the basis of the prediction result.

Furthermore, assuming that a frame immediately after the still image recording operation, that is, the "k"-th frame is taken as a reference frame, the movement detecting circuit for still image 28 detects a movement of a feature point between each of the three successive frames, that is, the "k+1"-th frame to the "k+3"-th frame, and the reference frame, but the reference frame may be "k+1"-th frame without being restricted to the frame immediately after the still image recording operation. In this case, the frames to be compared with the reference frame are not restricted to three frames succeeding to the reference frame, but may be three frames before and after the reference frame, such as three frame of the "k"-th frame, the "k+2"-th frame, and the "k+3"-th frame.

In this embodiment, for producing a still image for recording, 4 frames are added, but generally, N frames (N is an integer equal to or more than 2; preferably power of two) may merely be added. In this case, the exposure time is changed to 1/N times in response to a still image recording operation.

Furthermore, in this embodiment, in response to a still image recording operation, an exposure time is changed in such a direction as to shorten the time, but in place of this or in addition this, the aperture of the image sensor 14 may be changed in such a direction as to close the aperture. In brief, an excessive exposure due to the addition may be reduced by changing the amount of the exposure in such a direction as to decrease the same.

In the above description, the digital camera 10 is explained as one example, but the present invention can be applied to the imaging device capable of repetitively capturing an optical image of an object scene by the image sensor, such as a digital still camera, a digital video (movie) camera, a mobile phone terminal with camera, etc.

By the way, in the first embodiment, a noise reduction is not especially explained, but the adding processing executed in the camera shake correction circuit for still image 32 has an effect of suppressing the random noise included in the object scene image. In a second embodiment to be explained next, before such an adding processing, by executing clipping processing as executed in the camera shake correction circuit for motion image 22, it is possible to suppress an FPN as well as the movement due to a hand shake and the random noise.

Second Embodiment

Figure 8:
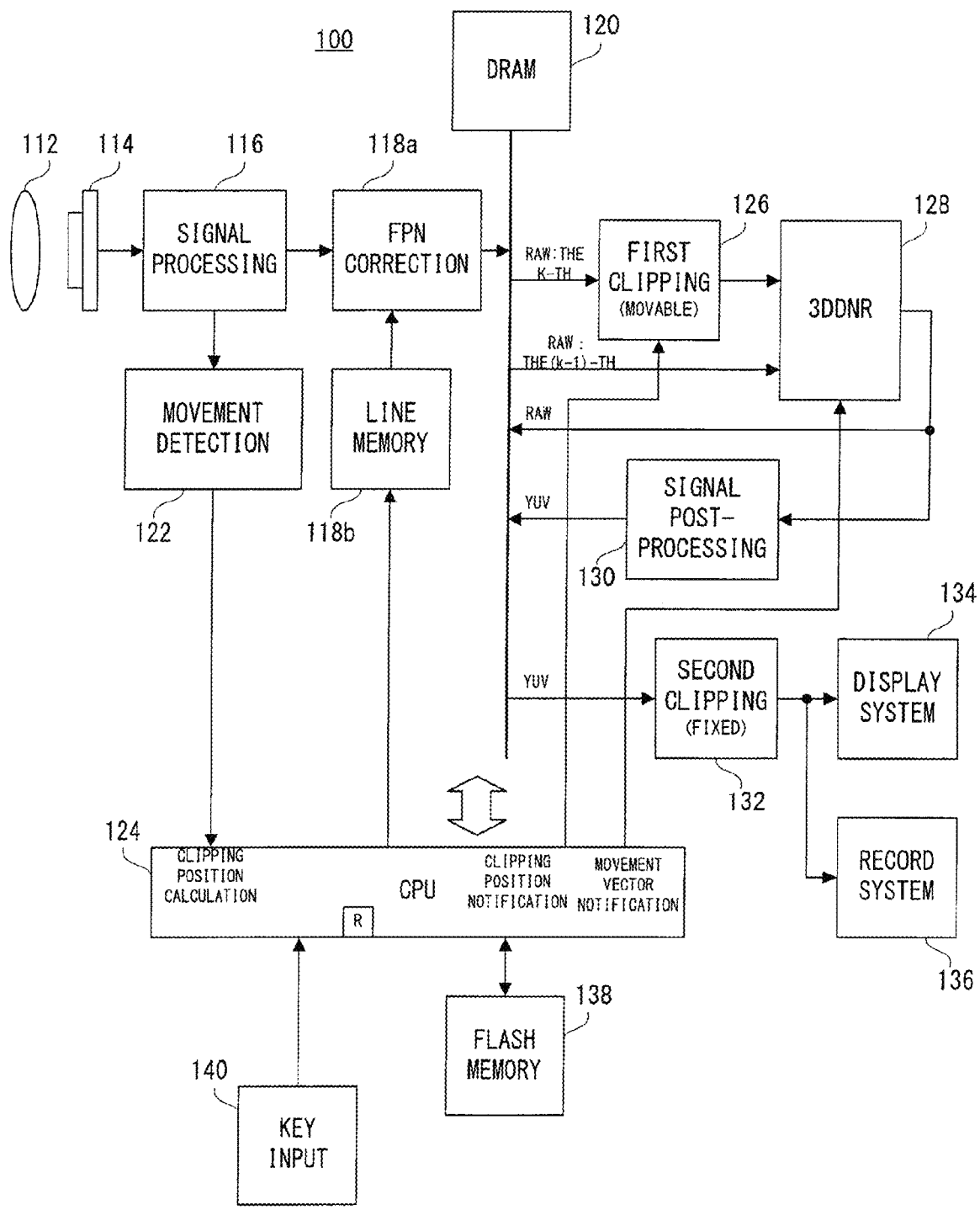
FIG. 8 is a block diagram showing a configuration of a second embodiment of the present invention.

With reference to FIG. 8, the digital movie camera 100 in this embodiment includes an optical lens 112, an image sensor 114, a signal preprocessing circuit 116, an FPN correction circuit 118*a*, a line memory 118*b*, a DRAM 120, a movement detection circuit 122, a CPU 124, a first clipping circuit 126, a 3DDNR circuit 128, a signal post-processing circuit 130, a second clipping circuit 132, a display system circuit 134, a record system circuit 136, a flash memory 138 and a key input device 140.

Additionally, the image sensor 114 is preferably made up of a CMOS (Complementary Metal-Oxide Semiconductor), but may be made up of other image-pick-up devices, such as a CCD (Charge-Coupled Device), etc.

Out of these components, each of the FPN correction circuit 118*a*, the line memory 118*b*, the first clipping circuit 126 and the second clipping circuit 132 is turned on or off by the CPU 124 on the basis of the presence or absence of FPN, the ON/OFF state of the camera shake correction mode, and the magnitude of a movement vector. The ON/OFF control (see FIG. 18) is based on FPN correction and clipping on/off controlling program (182*d*: see FIG. 11) stored in the flash memory 138. Furthermore, the 3DDNR circuit 128 is always placed at the ON state.

Figure 11:
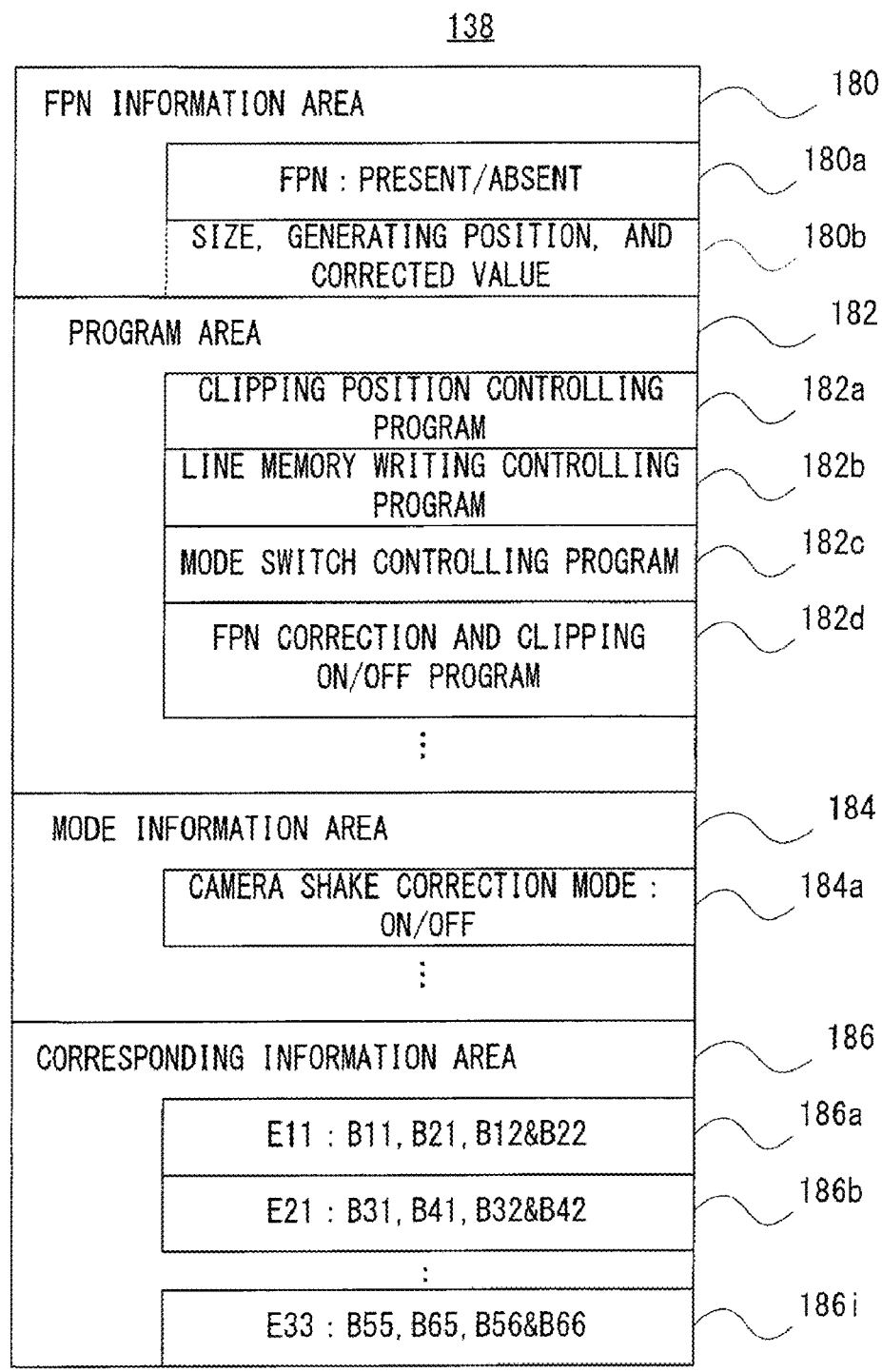
FIG. 11 is an illustrative showing a part of a memory map of a flash memory.

The configuration of the software of the digital movie camera 100 is explained. FIG. 11 shows a part of a memory map of the flash memory 138. Referring to FIG. 11, the flash memory 138 is formed with an FPN information area 180, a program area 182, a mode information area 184 and a corresponding information area 186.

The FPN information area 180 stores FPN information in relation to the image sensor 114. The FPN information includes an FPN flag 180a and a size, generating position and corrected value information 180b. The FPN flag 180a is a flag indicative of the presence or absence of an FPN, and the size, generating position and corrected value information 180b is information describing the size of an FPN, the generating position of the FPN and the corrected value corresponding thereto. The size and the generating position of an FPN are common to a plurality of lines forming one frame, and therefore, the size, generating position and corrected value information 180b are enough by one line. Here, if an FPN is absent, the size, generating position and corrected value information 180b may be omitted.

The program area 182 stores a clipping position controlling program 182a, a line memory controlling program 182b, a mode switch controlling program 182c, a FPN correction and clipping on/off controlling program 182d, etc. The clipping position controlling program 182a is a program for calculating a clipping position on the basis of the detection result by the movement detection circuit 122 (movement vector data stored in movement vector areas 170-178 within a memory R integrated in the CPU 124: see FIG. 10), and notifying the calculation result (clipping position data stored in a clipping position area 179 within the memory R) to the first clipping circuit 126.

The line memory controlling program 182b is a program for reading a size, generating position and corrected value information 180b from the FPN information area 180 (see FIG. 11) and writing it to the line memory 118b. The mode switch controlling program 182c is for accepting a mode switching operation by the key input device 140, and updating the mode information in the mode information area 184 according to the operation result.

The FPN correction and clipping on/off controlling program 182d is a program for performing an ON/OFF control of the FPN correction circuit 118a, the first clipping circuit 126 and the second clipping circuit 132 on the basis of the presence or absence of FPN (FPN flag 180a), an ON/OFF state of the camera shake correction mode (camera shake correction mode flag 184a: described later), and the magnitude of the movement vector (movement vector areas 170-178 for detection areas E11-E33: see FIG. 10).

The mode information area 184 stores the camera shake correction mode flag 184a. The camera shake correction mode flag 184a is a flag for indicating the ON/OFF state of the camera shake correction mode, and controlled by the mode switch controlling program 182c.

The corresponding information area 186 stores information indicating a correspondence (see FIG. 13) between the detection areas (E11-E33) of the movement detection circuit 122 and the blocks (B11-B66) as a unit of the weighted addition processing (described later) by the 3DDNR circuit 128.

Furthermore, the above-described information and programs are written to the flash memory 138 before being transferred. The camera shake correction mode flag 184a is turned off in transferring, and is then updated in response to a mode switching operation by the key input device 140. Furthermore, the CPU 124 can process these programs (182a, 182b, ...) in parallels under the control of the multitasking OS, such as μITRON, etc.

Figure 18:
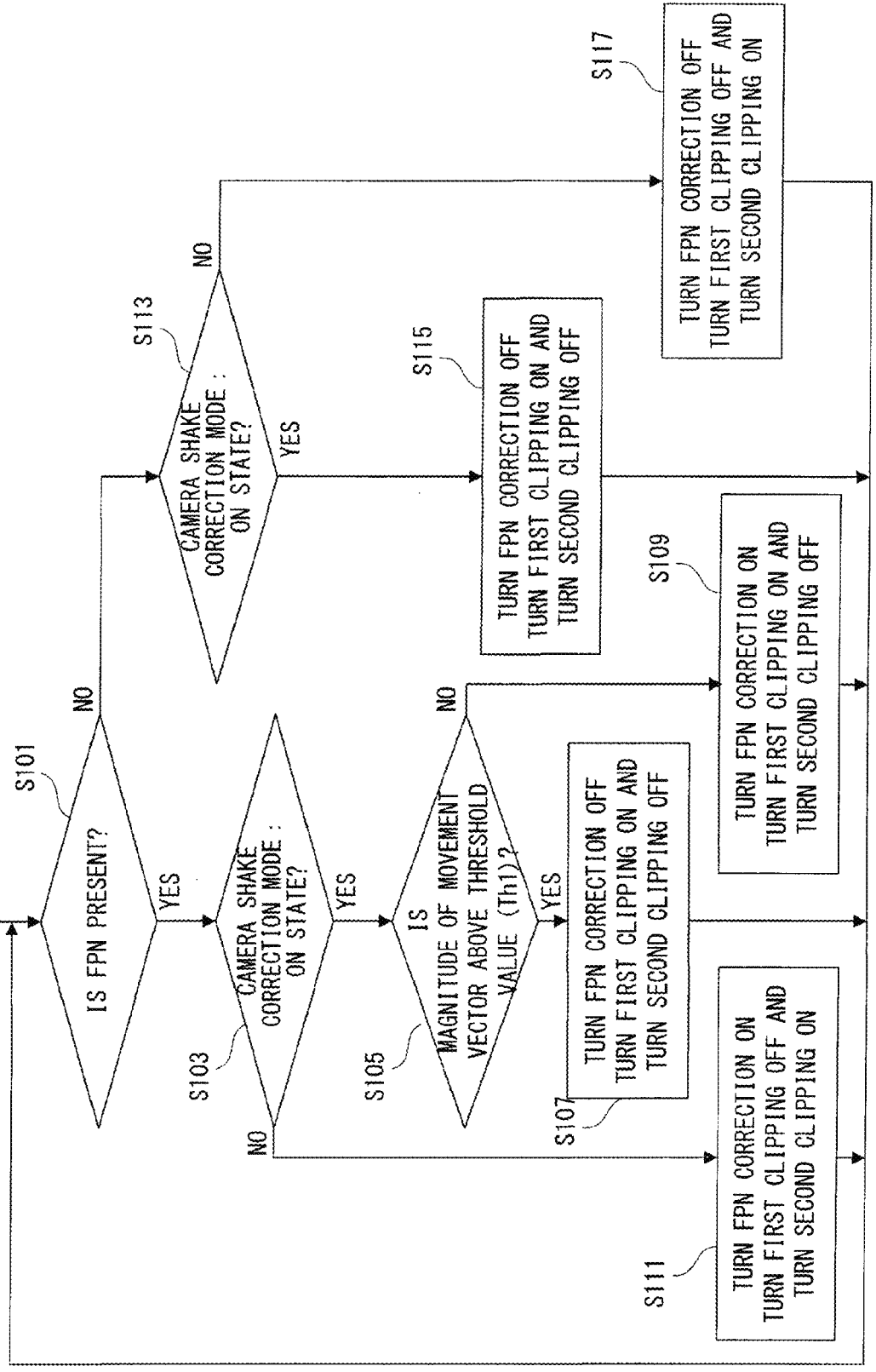
FIG. 18 is a flowchart showing a part of an operation of a CPU 124 applied to a second embodiment.

Now, FIG. 18 shows a flowchart corresponding to the FPN correction and clipping on/off controlling program 182d. With reference to FIG. 18, the CPU 124 first determines the presence or absence of an FPN on the basis of the FPN flag 180a (see FIG. 11) in a step S101. If the determination result in the step S101 is "YES", that is, if "an FPN is present", the process shifts to a step S103.

In the step S103, it is determined whether or not the camera shake correction mode is an ON state on the basis of the camera shake correction mode flag 184a. If the determination result in the step S103 is "YES", that is, if "the camera shake correction is an ON state", the process shifts to a step S105 while if the determination result is "NO", that is, if "the camera shake correction is an OFF state", the process shifts to a step S111.

In the step S105, it is determined whether or not the magnitude of the movement vector of the k-th frame with respect to the (k−1)-th frame (hereinafter referred to as "k:k−1") is larger than a threshold value (Th1) on the basis of the movement vector data stored in the memory R. Here, the threshold value Th1 is determined in relation to the size of the FPN, and is preferably selected so as to take a value slightly larger than the size of the FPN described in the size, generating position and corrected value information 180b.

Figure 10:
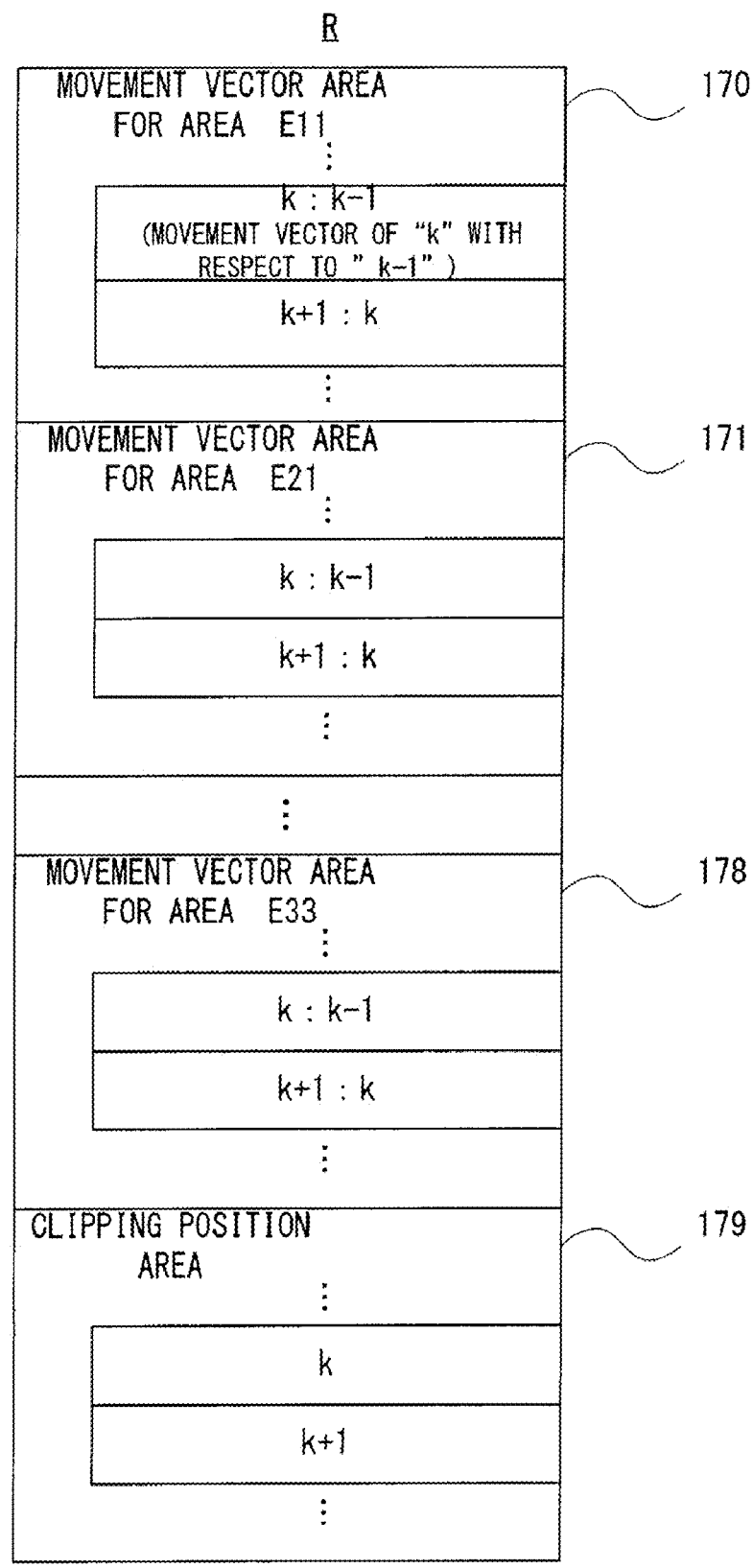
FIG. 10 is an illustrative showing a part of a memory map of an internal memory of a CPU 124.

Referring to FIG. 10, the memory R includes the nine movement vector areas 170-178 respectively corresponding to the nine detection areas E11-E33. The movement vector areas 170-178 respectively store data indicating the movement vectors detected in the detection areas E11-E33.

If the magnitude of at least any one of the nine movement vectors "k:k−1" stored in the movement vector area 170-178 is above the threshold value, "YES" is determined in the step S105 and the process shifts to a step S107. On the other hand, if all the magnitudes are equal to or smaller than the threshold value, "NO" is determined in the step S105, and the process shifts to a step S109.

In the step S107, the FPN correction circuit 118a is turned off, and the first clipping circuit 126 is turned on while the second clipping circuit 132 is turned off. In the step S109, the FPN correction circuit 118a is turned on, and the first clipping circuit 126 is turned on while the second clipping circuit 132 is turned off. In a step S111, the FPN correction circuit 118a is turned on, and the first clipping circuit 126 is turned off while the second clipping circuit 132 is turned on. Then, the process returns to the step S101.

If the determination result in the step S101 is "NO", that is, if "an FPN is absent", the process shifts to a step S113. In the step S113, it is determined whether or not the camera shake correction mode is an ON state on the basis of the camera shake correction mode flag 184a similar to the step S103. If determination result in the step S113 is "YES", the process shifts to a step S115 while if the determination result is "NO", the process shifts to a step S117.

In the step S115, similar to the step S107, the FPN correction circuit 118a is turned off, and the first clipping circuit 126 is turned on while the second clipping circuit 132 is turned off. In the step S117, the FPN correction circuit 118a is turned off, and the first clipping circuit 126 is turned off while the second clipping circuit 132 is turned on. Then, the process returns to the step S101.

Accordingly, a state relating to FPN correction and clipping of the digital movie camera 100 when an FPN is present is sifted among a state corresponding to the period during which the step S107 is executed (hereinafter referred to as "S107 state"), a state corresponding to the period during which the step S109 is executed (S109 state), and a state corresponding to the period during which the step S111 is executed (S111 state).

On the other hand, a state relating to FPN correction and clipping of the digital movie camera 100 when an FPN is absent is shifted between a state corresponding to the period during which the step S115 is executed (S115 state) and a state corresponding to the period during which the step S117 is executed (S117 state).

First, an operation in the "S107 state" is explained. Referring again to FIG. 8, an optical image of an object scene through the optical lens 112 is irradiated onto the acceptance surface, that is, the imaging surface of the image sensor 114, on which electric charges, that is, a raw image signal corresponding to the optical image of the object scene is generated by photoelectronic conversion. The image sensor 114 repetitively executes an exposure over an exposure time T and reading of a raw image signal thus generated at a cycle of 1/60 seconds, for example. The raw image signal corresponding to the optical image of the object scene is output from the image sensor 114. The output raw image signal is subjected to pre-processing such as an A/D conversion, a clamp, etc. by a signal preprocessing circuit 116, to thereby produce raw image data. The produced raw image data is applied to the FPN correction circuit 118a.

Figure 9:
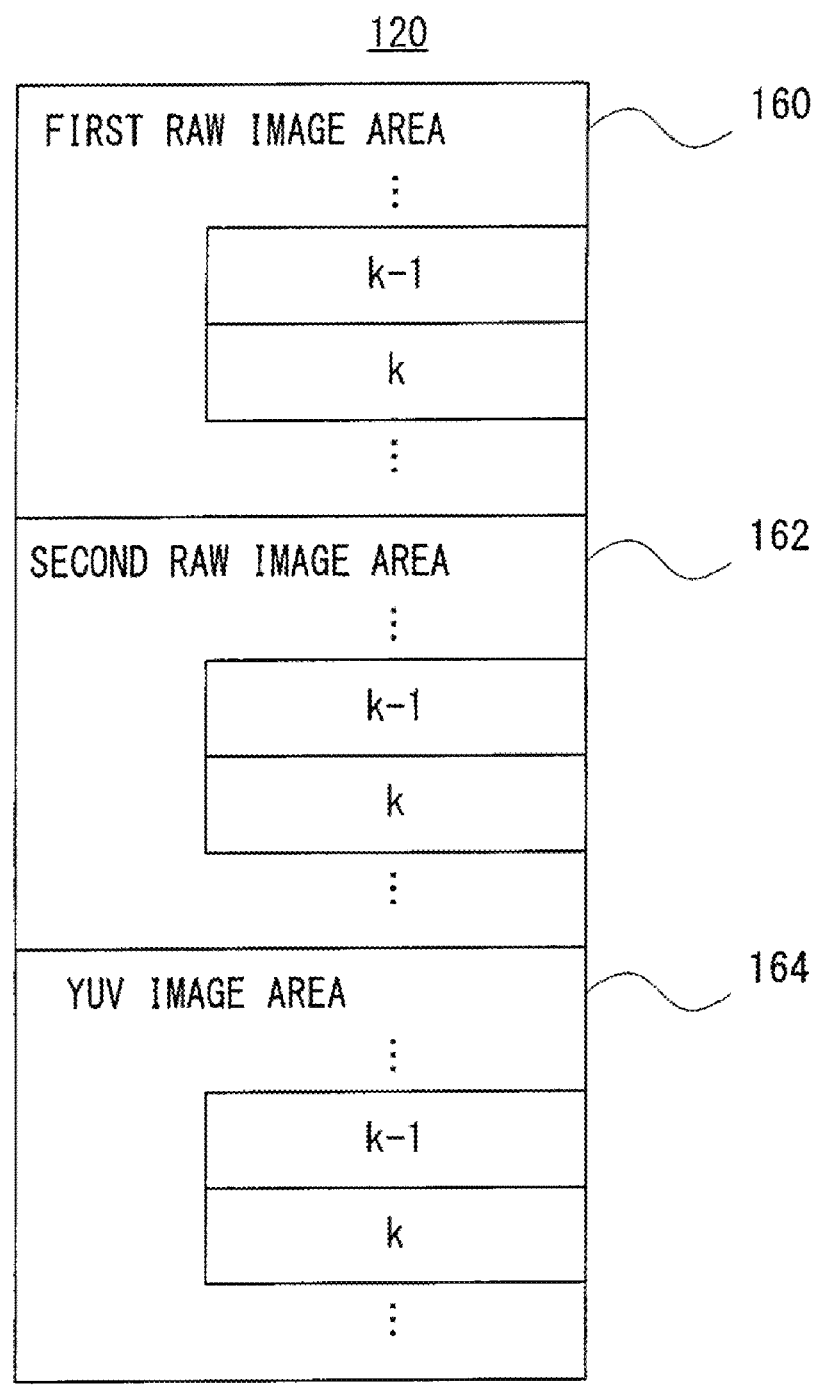
FIG. 9 is an illustrative view showing a part of a memory map of a DRAM.

At this time, the FPN correction circuit 118a is in a suspended state, and the writing processing (described later) to the line memory 118b by the CPU 124 is also not executed. The applied raw image data is written to a first raw image area 160 (FIG. 9) of a DRAM 120 without passing through the FPN correction circuit 118a.

The raw image data produced by the signal preprocessing circuit 116 is also applied to the movement detection circuit 122. The movement detection circuit 122 detects a movement vector on the basis of the applied raw image data. Specifically, the nine detection areas E11-E33 are assigned to the object scene (see FIG. 13), and the movement of the feature point, that is, the movement vector is repetitively detected between the current frame (k) and the frame (k−1) immediately before for each detection area. The detection result of the movement detection circuit 122, that is, nine "k:k−1" respectively corresponding to the nine detection areas E11-E33 are written to the memory R integrated in the CPU 124 (see FIG. 10).

The CPU 124 calculates for each frame a clipping position so as to cancel out the movement of the object scene image due to the hand shake on the basis of the movement vector stored in the memory R, and notifies the clipping position information indicating the calculation result to the first clipping circuit 126.

The raw image data stored in the first raw image area 160 is then applied to the first clipping circuit 126. The clipping area E1 of the first clipping circuit 126 is moveable (see FIG. 12(A)), and the first clipping circuit 126 performs clipping processing of clipping a part corresponding to the clipping area E1 from each frame on the applied raw image data while moving the clipping area E1 on the basis of the clipping position information notified from the CPU 124. By the first clipping processing, the movement component in a time axis direction included in the raw image data due to a hand shake is suppressed.

The raw image data output from the first clipping circuit 126 is then applied to the 3DDNR circuit 128. At this time, raw image data before one frame stored in the second raw image area 162 is further applied to the 3DDNR circuit 128 as reference data, and the CPU 124 notifies the movement vector stored in the memory R to the 3DDNR circuit 128. That is, the raw image data of the two frame at the k-th and at the (k−1)-th and the nine movement vectors "k:k−1" between these two frames are input at a common timing to the 3DDNR circuit 128.

Figure 14:
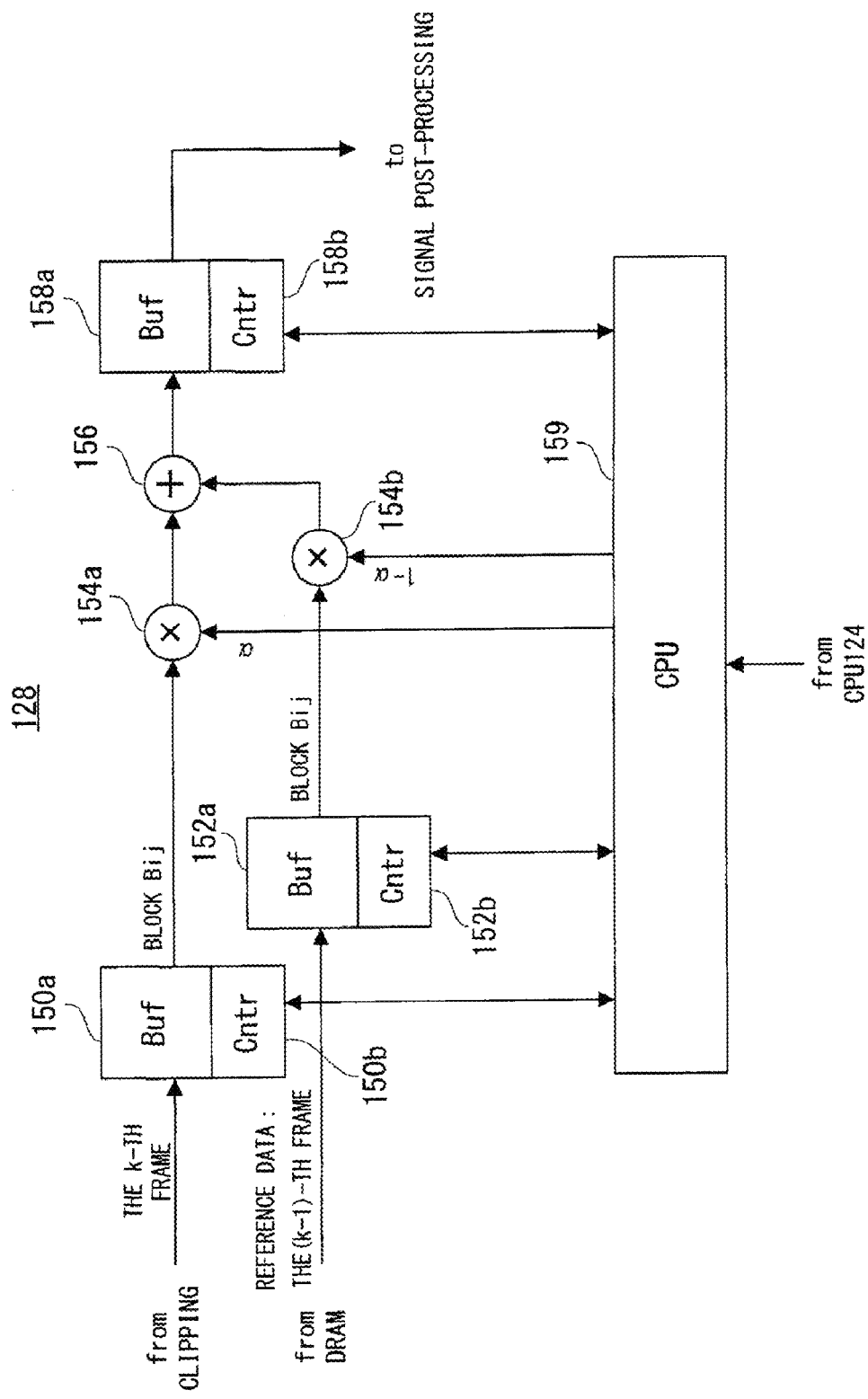
FIG. 14 is a block diagram showing an example of the configuration of the 3DDNR circuit applied to the second embodiment.
Figure 15:
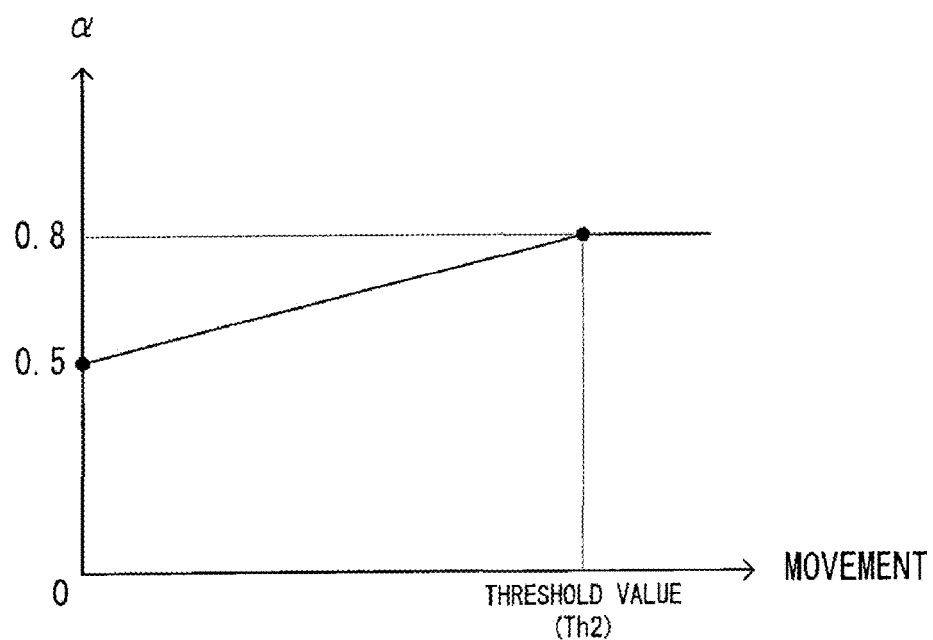
FIG. 15 is an illustrative view showing a function utilized in weighted addition processing by the 3DDNR circuit.
Figure 19:
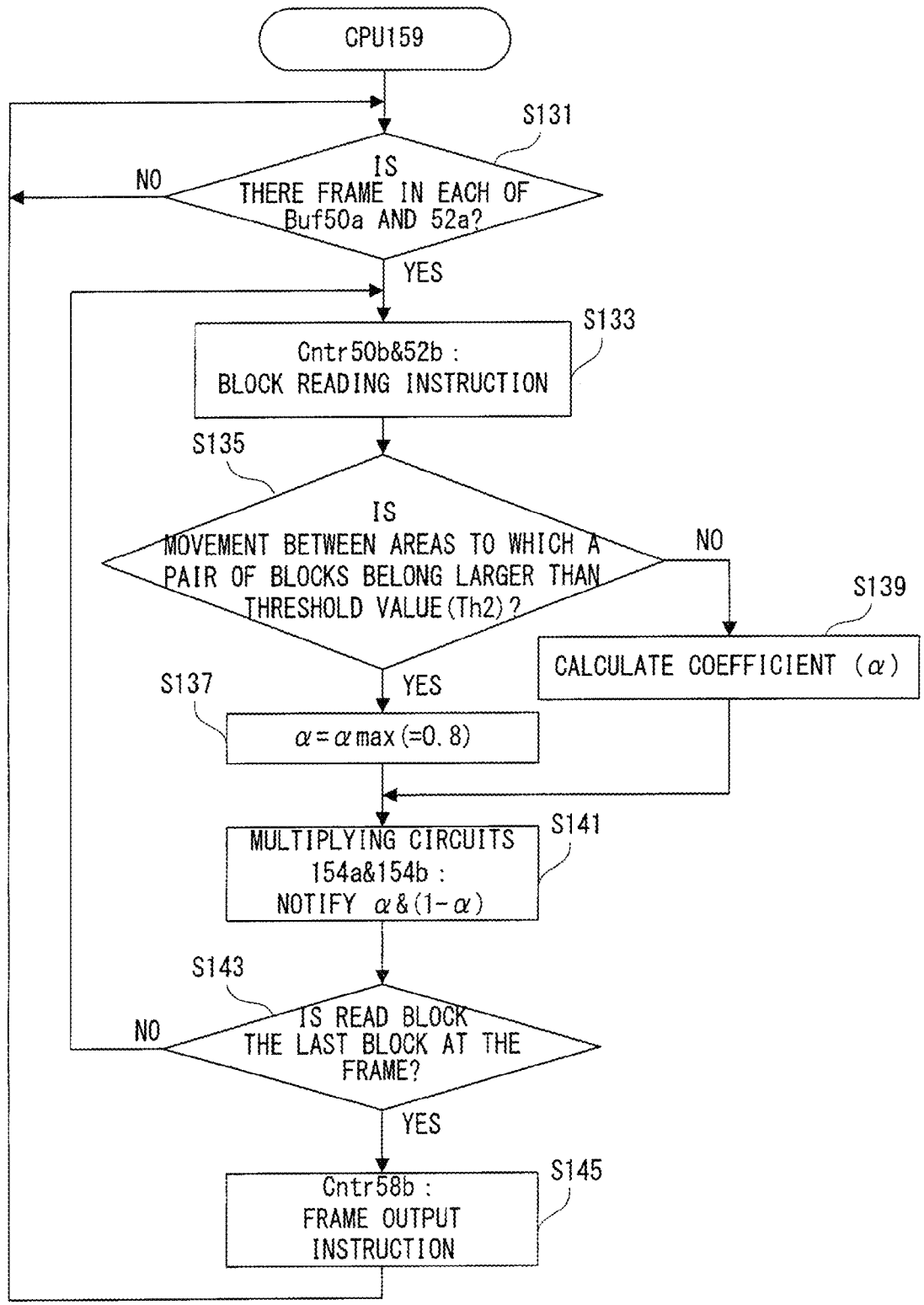
FIG. 19 is a flowchart showing a part of an operation of a CPU 159 applied to the second embodiment.

The 3DDNR circuit 128 performs weighted addition processing on the basis of the nine movement vectors "k:k−1" on the raw image data at the k-th frame and the raw image data at the (k−1)-th frame. FIG. 14, FIG. 15 and FIG. 19 explain in detail the 3DDNR circuit 128 and the weighted addition processing executed thereby.

Referring to FIG. 14, the 3DDNR circuit 128 includes a buffer 150a and a controller 150b, a buffer 152a and a controller 152b, a pair of multiplying circuits 154a and 154b, an adding circuit 156, a buffer 158a and a controller 158b, and a CPU 159. The raw image data from the first clipping circuit 126 is written to the buffer 150a and the raw image data from the DRAM 120 is written to the buffer 152a.

When the k-th frame is stored in the buffer 150a, and the (k−1)-th frame is stored in the buffer 152a, the controller 150b and the controller 152b respectively divide the frame stored in the buffer 150a and the buffer 152a into 36 blocks of 6×6 (B11-B66: see FIG. 13), and reads the 36 blocks in order in response to a block reading instruction repetitively issued by the CPU 159.

The read pair of blocks, that is, the block Bij read from the buffer 150a and the block Bij read from the buffer 152a are respectively input to the multiplying circuit 154a and the multiplying circuit 154b. At this time, the CPU 159 specifies one corresponding to the block Bij out of the nine movement vectors "k: k−1", and determines a coefficient α on the basis of the specified movement vector.

The coefficient "a" is applied to the multiplying circuit 154a, and the multiplying circuit 154a multiplies the input block Bij by the applied coefficient "α". On the other hand, the coefficient "1−α" is applied to the multiplying circuit 154b, and the multiplying circuit 154b multiplies the input block Bij by the coefficient "1−α".

The multiplying result of the multiplying circuit 154a and the multiplying result of the multiplying circuit 154b are added to each other in the adding circuit 156. Then, the adding result by the adding circuit 156, that is, the block Bij to which the weighted addition is performed is written to the buffer 158a.

When the last block at the k-th frame, that is, the block B 66 is written to the buffer 158a, the CPU 159 issues a frame reading instruction to the controller 158b, and the controller 158b outputs 36 blocks stored in the buffer 158a as one frame.

The aforementioned processing by the CPU 159 is according to a flowchart shown in FIG. 19. Referring to FIG. 19, in a first step S131, it is determined whether or not each of the buffer 150a and buffer 152a stores a frame, and if the determination result is "NO", a standby state is held. If the determination result in the step S131 is "YES", the process shifts to a step S133 to issue a block reading instruction to each of the controller 150b and the controller 152b. Thereafter, the process proceeds to a step S135.

In the step S135, it is determined whether or not the movement between a pair of the blocks read in response to the block reading instruction, that is, the block Bij at the k-th frame and the block Bij at the (k−1)-th frame is large on the basis of the movement vector information notified from the CPU 124.

More specifically, first, the detection area corresponding to the pair of blocks is specified on the basis of the corresponding information 186a-186i stored in the corresponding information area 186. For example, if the pair of blocks is "B11", because "B11" is described in the corresponding information 186a, the corresponding detection area is found to be "E11".

Next, the movement vector corresponding to the detection area specified as described above is selected out of the nine movement vectors "k:k−1" respectively corresponding to the detection areas E11-E33 notified from the CPU 124, and the magnitude of the selected "k:k−1" is compared with a threshold value (Th2). Then, if "|k:k−1|>Th2", it is determined the movement is large while if "|k:k−1|Th2", it is determined that the movement is small.

If the determination result in the step S135 is "YES", that is, if the movement is large, the coefficient α is regarded as a maximum value αmax (0.8, for example) in a step S137. If the determination result in the step S135 is "NO", that is, if the movement is small, the coefficient α is calculated in a step S139. The calculating processing is based on a function or a table defining a relationship between the movement, that is, |k:k−1| and the coefficient α. FIG. 15 shows one example of such a function.

Referring to FIG. 15, the function corresponds to the line segment having two points (0, 0.5) and (Th2, 0.8) at both ends, and if the movement is in the section above Th2, α=0.8. Generally, it is only necessary be the function in which when the movement is "0", α becomes a minimum, as the movement increases, α is made large, and when the movement is "Th2", α is made a maximum. In a case of utilizing a table, distributed values calculated from the function, such as (0, 0.5), (1, 0.6), . . . , (Th2, 0.8) are registered.

Returning to FIG. 19, when a coefficient is determined in the step S137 or S139, the process proceeds to a step S141. In the step S141, the "a" and "1−α" are respectively notified to the multiplying circuit 154a and 154b. In a succeeding step S143, it is determined whether or not the block read immediately before is the last block of the frame, and if "NO", the process returns to the step S133. If "YES" in the step S143, the process shifts to a step S145 to issue a frame outputting instruction to the controller 158b, and then, the process returns to the step S131.

By such weighted addition processing, it is possible to suppress the random noise included in the raw image data.

Referring again to FIG. 8, the raw image data output from the 3DDNR circuit 128 is written to the second raw image area 162 (see FIG. 9) of the DRAM 120. The image data thus stored in the second raw image area 162 is then applied to the 3DDNR circuit 128 as reference data.

The raw image data output from the 3DDNR circuit 128 is also applied to the signal post-processing circuit 130. The signal post-processing circuit 130 performs post-processing, such as a color separation, a gamma correction, a YUV conversion, etc. on the applied raw image data. Thus, the raw image data is converted to the YUV image data.

The YUV image data thus obtained is written to a YUV area 164 (see FIG. 9) within the DRAM 120. The YUV image data stored in the YUV area 164 is then applied to the second clipping circuit 132. At this time, the second clipping circuit 132 is in a suspended state, and therefore, the applied YUV image data is applied to each of the display system circuit 134 and the record system circuit 136 without passing through the second clipping circuit 132.

In the display system circuit 134, processing of driving an LCD monitor (not shown) with the applied YUV image data, etc. is executed. In the record system circuit 136, processing of compressing the applied YUV image data, recording the compressed image data in a recording medium (not shown), etc. are executed.

Next, an operation of the "S109 state" is explained. Referring again to FIG. 8, the image sensor 114 repetitively executes exposure and reading of the raw image signal thus generated similar to the "S107 state". The raw image signal output from the image sensor 114 is subjected to preprocessing in the signal preprocessing circuit 116, and the raw image data thus generated is applied to the FPN correction circuit 118a in lines.

The CPU 124 reads the size, generating position and corrected value information 180b (see FIG. 11) from the flash memory 138, and writes the same in the line memory 118b. The writing processing is based on the line memory writing controlling program 182b (see FIG. 11). The FPN correction circuit 118a performs an FPN correction on the applied raw image data on the basis of the size, generating position and corrected value information 180b stored in the line memory 118b. Thus, the FPN included in the raw image data is suppressed.

The raw image data stored in the first raw image area 160 is then applied to the first clipping circuit 126 so as to be subjected to similar first clipping processing.

At this time, as in the "S107 state", the raw image data before one frame stored in the second raw image area 162 is applied to the 3DDNR circuit 128 as reference data. The movement detection circuit 122 performs similar movement vector detection, and notifies the detection result to the 3DDNR circuit 128 through the CPU 124. The 3DDNR circuit 128 executes weighted addition processing on the applied raw image data on the basis of the notified movement vector.

The raw image data output from the 3DDNR circuit 128 is written to the second raw image area 162 of the DRAM 120, and then applied to the 3DDNR circuit 128 as reference data. The raw image data output from the 3DDNR circuit 128 is also applied to the signal post-processing circuit 130 so as to be converted into YUV image data. The YUV image data is written to the YUV area 164 within DRAM 120, and then applied to the second clipping circuit 132.

At this time, as in the "S107 state", the second clipping circuit 132 is in a suspended state, and the applied YUV image data is applied to each of the display system circuit 134 and the record system circuit 136 without passing through the second clipping circuit 132. In the display system circuit 134, LCD driving processing, and etc. is performed, and in the record system circuit 136, compression processing, recording processing, and etc. are executed.

Figure 16:
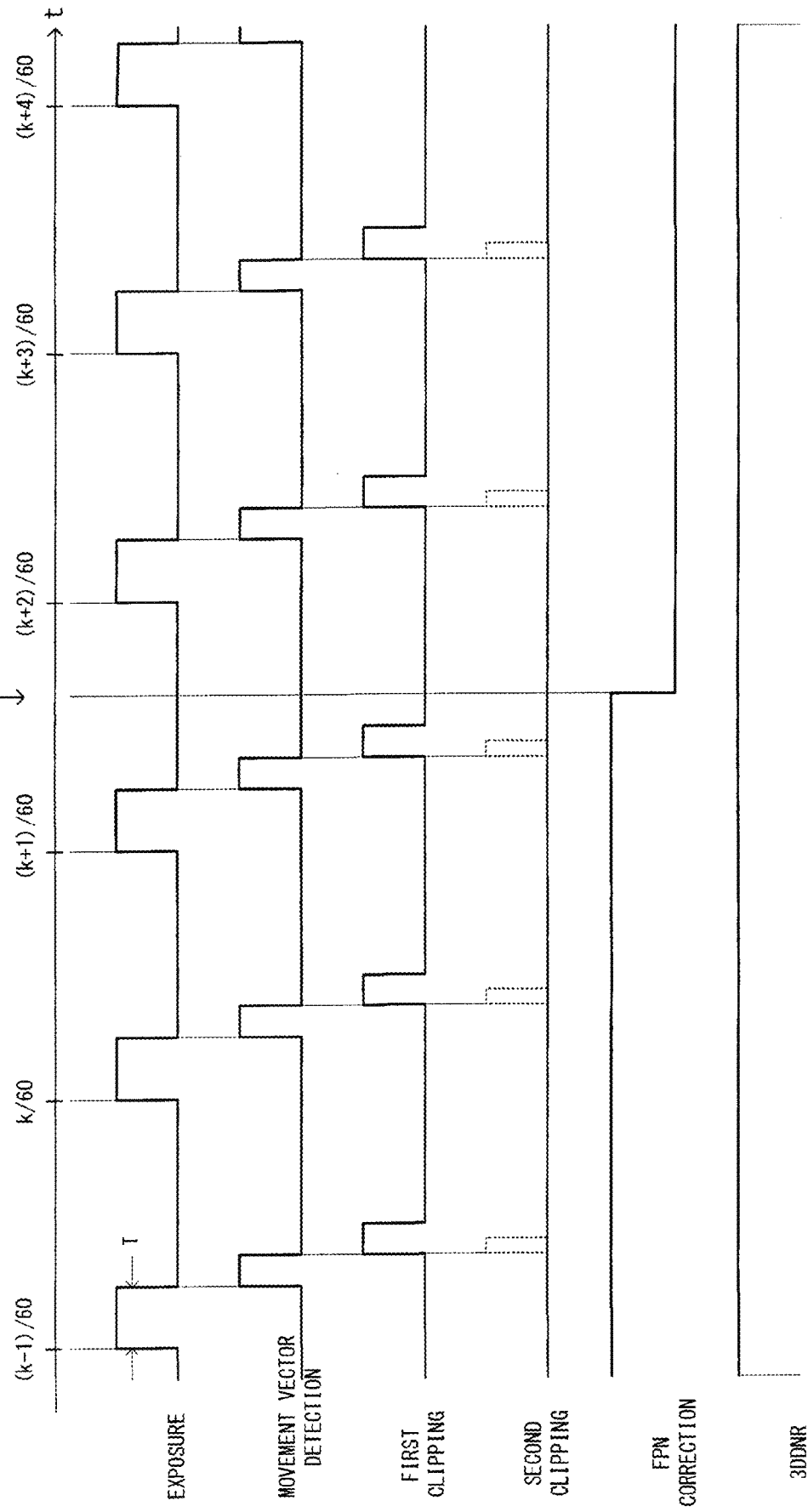
FIG. 16 is a timing chart showing an example of an operation of each element of the second embodiment.

Here, a state transition from the "step S107 state" to the "step S109 state" is shown in a timing chart in FIG. 16. Referring to FIG. 16, while the magnitude of the movement vector is equal to or smaller than the threshold value, each of the first clipping processing, the FPN correction processing and the 3 DDNR processing is continued, and the second clipping processing is suspended. If the magnitude of the movement vector is above the threshold value, the FPN correction processing is stopped. Each of the first clipping processing and 3DDNR processing is continued, and the second clipping processing remains to be stopped.

Next, an operation of the "S111 state" is explained. The "S111 state" is a sate in which the first clipping circuit 126 is suspended and the second clipping circuit 132 is started in the "109 state". Accordingly, in the "step S111 state", the clipping position calculating and notifying processing by the CPU 124 is not executed. Thus, the raw image data of the first raw image area 160 is applied to the 3DDNR circuit 128 without passing through the first clipping circuit 126. On the other hand, the YUV image data from the YUV area 164 is subjected to the clipping processing by the second clipping circuit 132, and then applied to each of the display system circuit 134 and the record system circuit 136.

The clipping area E2 of the second clipping circuit 132 is fixed (FIG. 12(B)), and the second clipping circuit 132 performs on the applied YUV image data clipping processing of clipping a part corresponding to the clipping area E2 from each frame. The change in the image size by stopping/restarting the first clipping processing is cancelled by executing the second clipping processing. Other than this, the operation is similar to that in the "S109 state".

Figure 17:
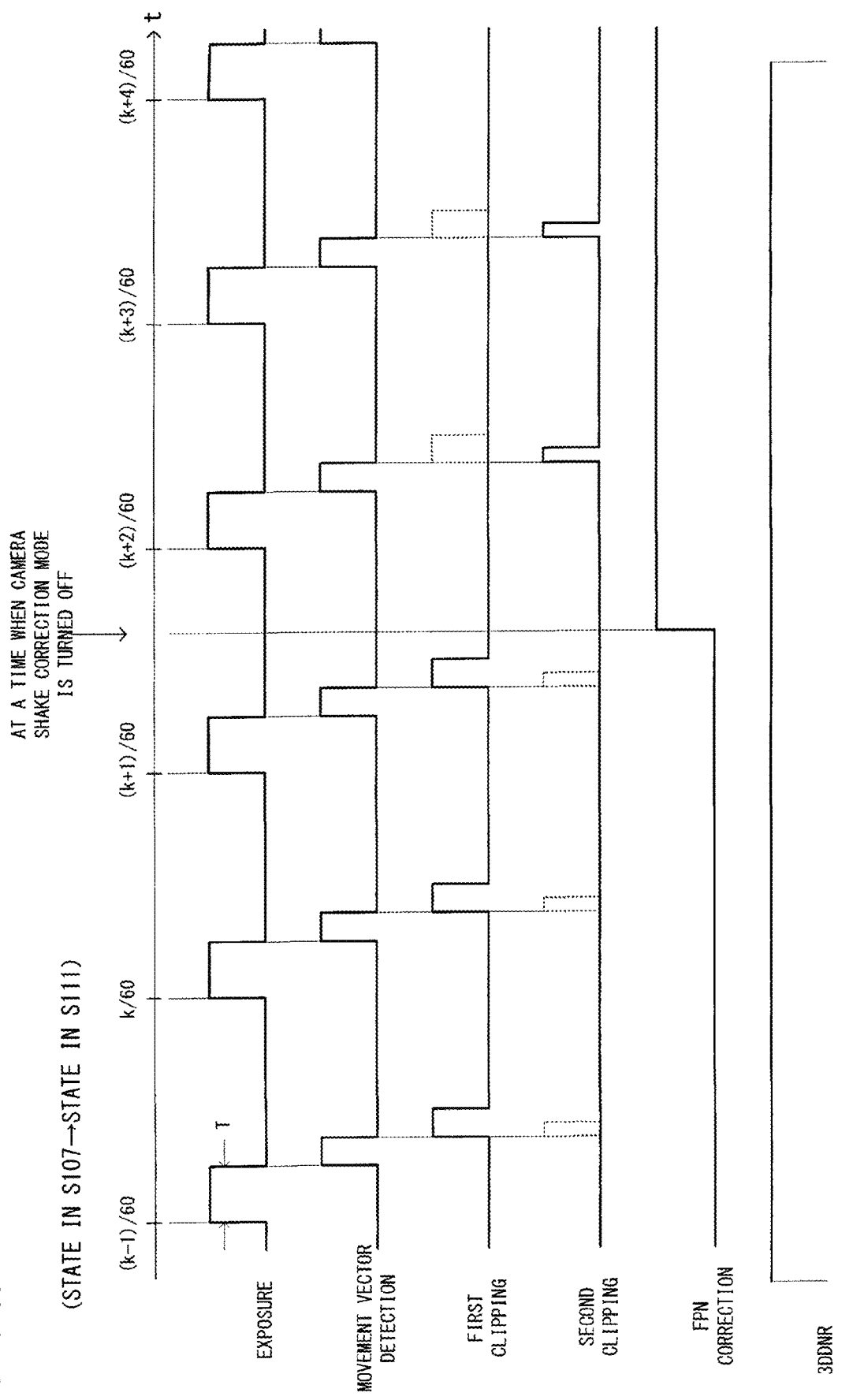
FIG. 17 is a timing chart showing another example of the operation of each element of the second embodiment.

Here, a state transition from the "S107 state" to the "S111 state" is shown in a timing chart in FIG. 17. Referring to FIG. 17, while the camera shake correction is turned on, each of the first clipping processing and the 3DDNR processing is continued, and each of the second clipping processing and the FPN correction processing is suspended. When the camera shake correction is turned off, the first clipping processing is stopped, and each of the FPN correction processing and the second clipping processing is activated. The 3DDNR processing is continued.

Last, an operation in each of the S15 sate and the S117 state is briefly explained. The "S115 state" is the same as the "S107 state", and the operations to be performed are common to each other.

The "S117 state" is a state in which the FPN correction circuit 118a is further suspended in the "S111 state". Accordingly, in the "step S117 state", the raw image data from the signal preprocessing circuit 116 is written to the first raw image area 160 of the DRAM 120 without passing through the FPN correction circuit 118a. Other than this, the operation is the same as that in the "S111 state".

As understood from the foregoing, in this embodiment, an optical image of the object scene is repetitively captured by the image sensor 114, from which a plurality of object scene images according to a time series are output. The FPN correction circuit 118a performs FPN correction processing on the plurality of object scene images, and the movement detection circuit 122 detects the movement of the feature point between the plurality of object scene images.

The first clipping circuit 126 performs clipping processing on each of the plurality of object scene images on the basis of the detection result by the movement detector. That is, the clipping position by the first clipping circuit 126 moves in correspondence with the movement of the feature point. Thus, by making the clipping position follow the movement of the feature point, it is possible to suppress the movement among the plurality of object scene images.

Then, adding processing of adding the object scene image immediately before to each of the plurality of object scene images according to the time series on which the clipping processing by the first clipping circuit 126 is performed is performed by the 3DDNR circuit 128. Thus, it is possible to suppress the random noise included in each of the plurality of object scene images.

On the other hand, the CPU 124 repetitively determines whether or not the movement detected by the movement detector is above the threshold value (S105), and when the determination result is affirmative, the FPN correction circuit 118a is made invalid (S107) while if the determination result is negative, the FPN correction circuit 118a is made valid (S109).

Accordingly, while the movement is above the threshold value, the FPN correction circuit 118a is made invalid, and therefore, it is possible to reduce power consumption. Thus, even if the FPN correction circuit 118a is made invalid, the FPN is suppressed by the clipping processing by the first clipping circuit 126 and the following adding processing by the 3DDNR circuit 128. The reason why is because by the movement of the clipping position, the FPN has a property as a random noise as a result, and is suppressed in the 3DDNR circuit 128.

Furthermore, in this embodiment, in the 3DDNR circuit 128, each of the buffer 150a and the controller 150b, and the buffer 152a and the controller 152b divides a pair of object scene images to be added with each other into blocks B11-B66 (common partial image), and the multiplying circuits 154a and 154b and the adding circuit 156 assign a weight to the division result by the coefficient for each block and add the weighed results. The coefficient ($\alpha$) for weighing is determined for each block by the CPU 159 on the basis of the movement vector notified from the movement detection circuit 122 via the CPU 124. Thus, by deciding the coefficient for each common partial image, it is possible to avoid a blur at a portion with large movements.

Then, the blocks B11-B66 may be a single pixel or m pixels×n pixels (m and n are integers equal to or more than one), but by appropriately selecting the size of the block (several pixels×several pixels, for example), it is possible to reduce a throughput for deciding the coefficient. Thus, it is possible to appropriately suppress the random noise with a low throughput.

Additionally, in the 3DDNR circuit 128 in this embodiment, the CPU 159 decides the coefficient $\alpha$ on the basis of the movement vector notified from the movement detection circuit 122 via the CPU 124, but alternatively, a difference between a pair of block Bij and Bij respectively output from the buffer 150a and the buffer 152a is evaluated, and on the basis of the difference, the coefficient may be decided. Such modified example is shown in FIG. 20 and FIG. 21.

Figure 20:
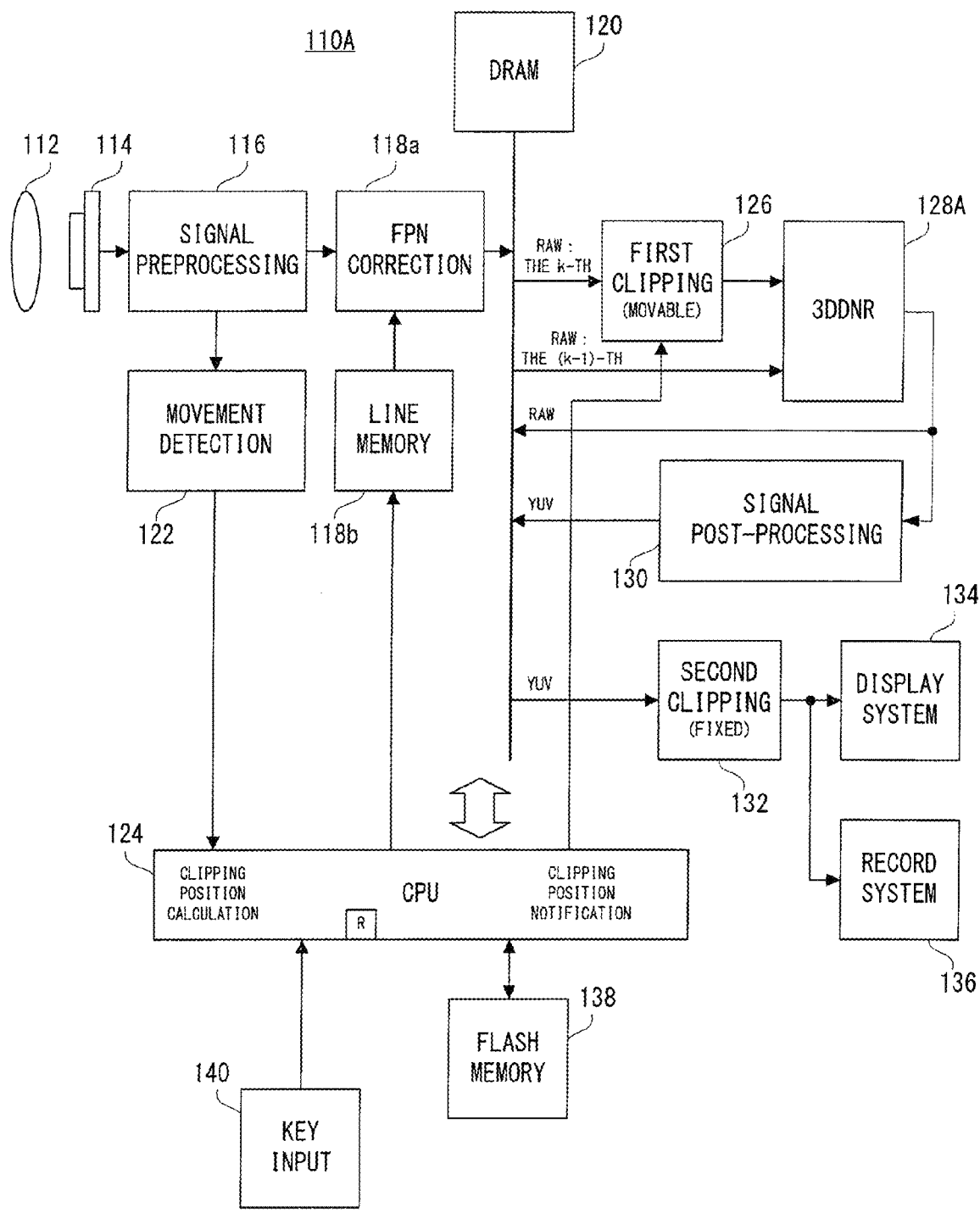
FIG. 20 is a block diagram showing a configuration of a modified example of the second embodiment.

Referring to FIG. 20, a digital movie camera 100A is an example in which in the digital movie camera 100 in FIG. 8, the notification of the movement vector form the CPU 124 to the CPU 159 is omitted, and the 3DDNR circuit 128 is replaced with a 3DDNR circuit 128A.

Figure 21:
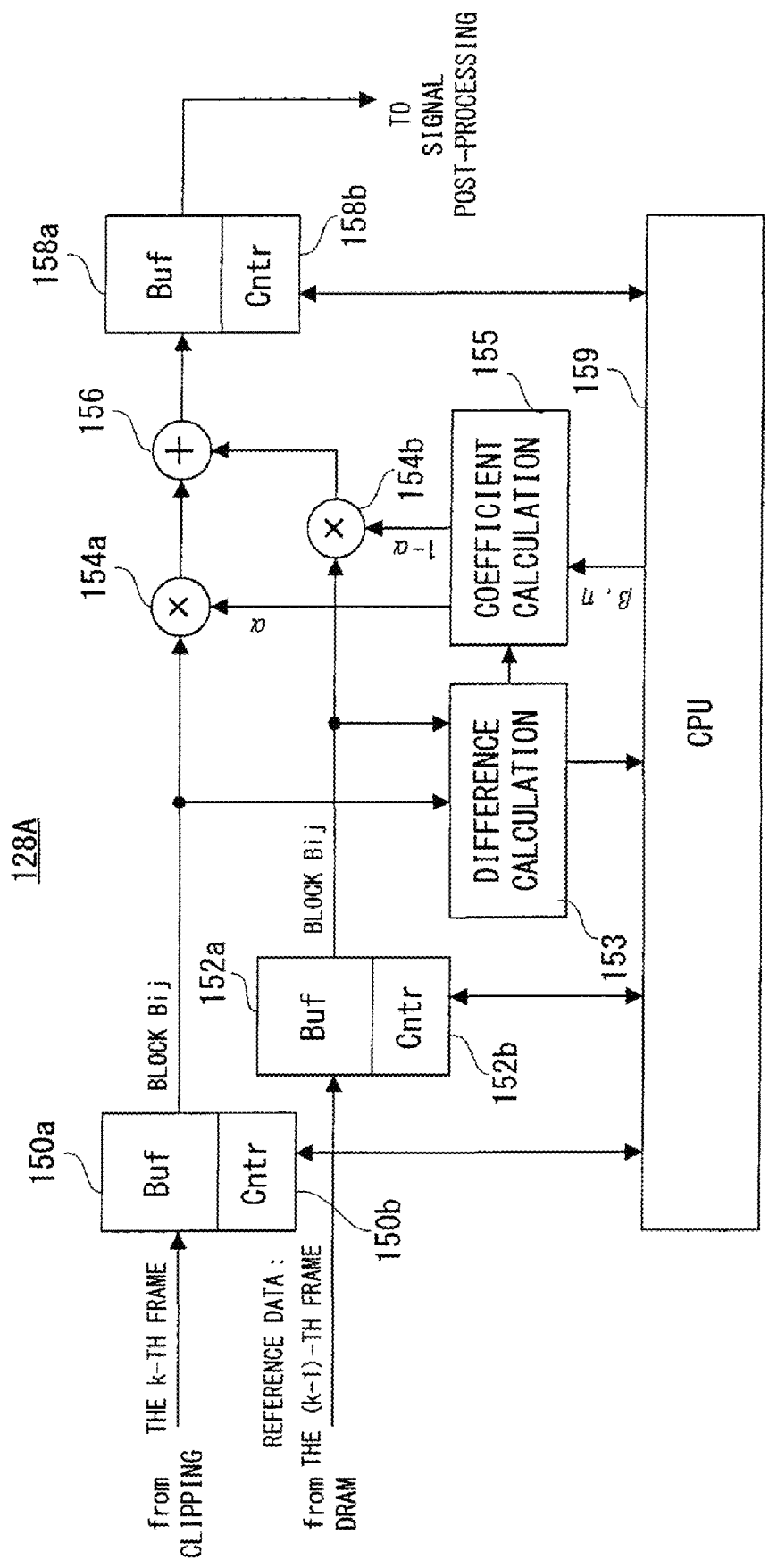
FIG. 21 is a block diagram showing a configuration of a 3DDNR circuit applied to the modified example.

Referring to FIG. 21, the 3DDNR circuit 128A is an example in which to the 3DDNR circuit 128 shown in FIG. 14, a difference calculating circuit 153 for calculating the difference between the blocks Bij and Bij output from the buffers 150a and 152a and a coefficient calculating circuit 155 for calculating a coefficient $\alpha$ on the basis of this calculation result are added.

The calculation result by the difference calculating circuit 153 is applied to each of the coefficient calculating circuit 155 and the CPU 159. The coefficient calculating circuit 155 evaluates the coefficient $\alpha$ on the basis of the applied difference from a following Eq. (1).

$$\alpha=\{\text{difference}\}\times\beta+\eta \quad (1)$$

Here, $\beta$ and $\eta$ are parameters respectively corresponding to an inclination and an intercept of the straight line, and set by the CPU 159.

Figure 22:
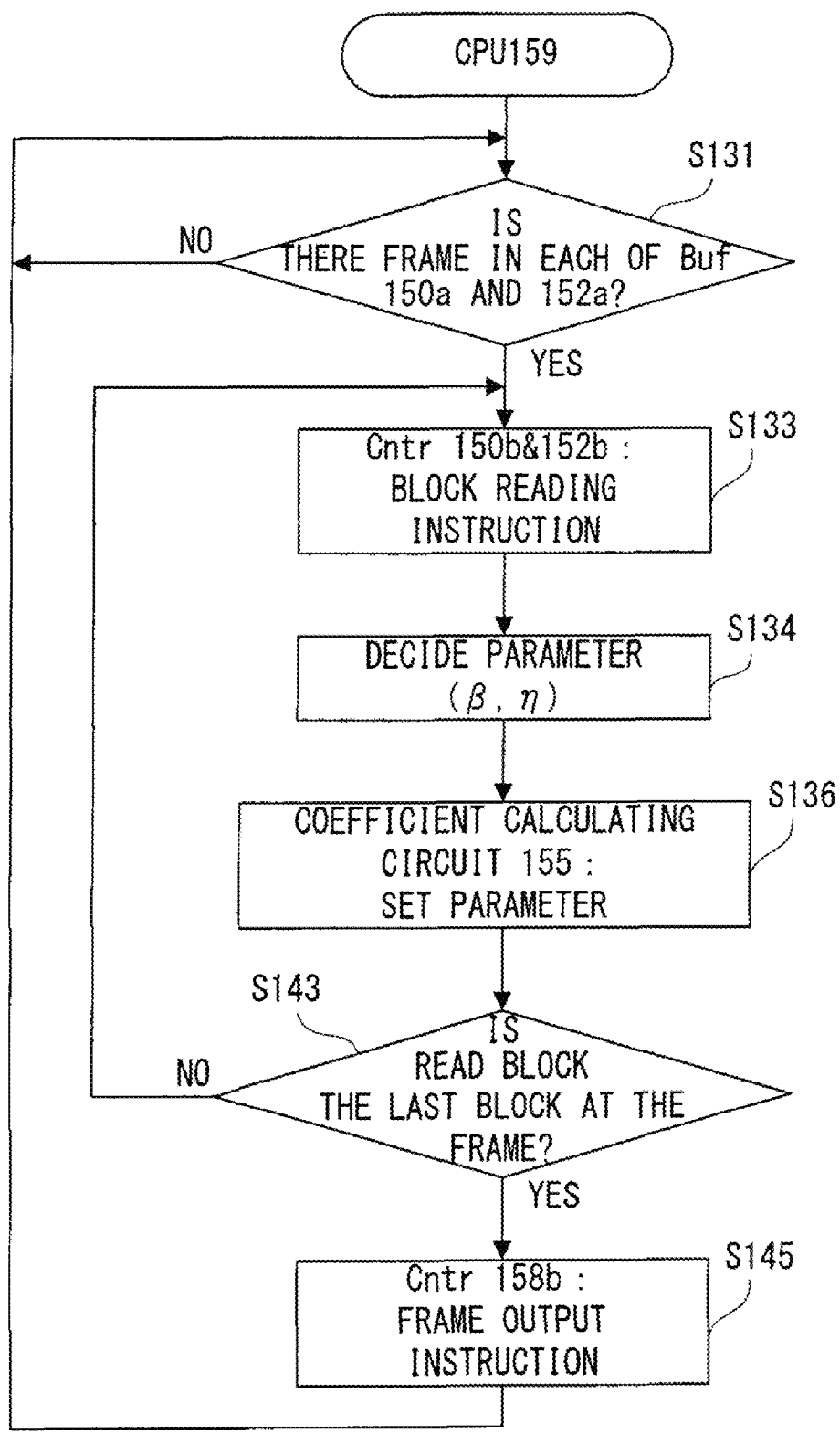
FIG. 22 is a flowchart showing a part of an operation of the CPU 159 applied to the modified example.

The CPU 159 decides the parameters $\beta$ and $\eta$ in the aforementioned Eq. (1) on the basis of the applied difference, and sets the decision result to the difference calculating circuit 153. FIG. 22 shows a flowchart of an operation of the CPU 159 in this case.

The flowchart shown in FIG. 22 has steps S134 and S136 in place of the steps S135-S141 in the flowchart in FIG. 19. In the step S134, the parameters 13 and $\beta$ and $\eta$ are decided on the basis of the difference from the difference calculating circuit 153, and the decision result is set to the coefficient calculating circuit 155 in the step S136. In response to the coefficient setting processing, the coefficients $\alpha$ and "1-$\alpha$" are respectively output to the multiplying circuits 154a and 154b from the coefficient calculating circuit 155.

It should be noted that the parameters β and η may be decided irrespective of the difference, or may be fixed values. In such a case, the calculation result by the difference calculating circuit 153 is not required to be notified.

Thus, it is possible to reduce the random noise more properly.

Furthermore, in this embodiment (or the modified example), the number of detection areas of the movement detection circuit 122 is nine, and these nine detection areas are arranged in a matrix manner of 3 lines by 3 columns (see FIG. 13), but the number and the size are not restricted thereto. For example, the four detection areas E11, E31, E13 and E33 arranged at the four corners of the frame are omitted, and at the portion to which the detection area is not assigned, the coefficient α may be fixed to a minimum value (0.5, for example). Here, in order to suitably remove the movement components between the frames due the hand shake in the first clipping circuit 126, and properly remove the random noise (including the movement components between the frames due the hand shake) in the 3DDNR circuit 128, 128A, a matrix manner of m lines by n columns (m is an integer equal to or more than three, and n is an integer equal to or more than three) is preferable.

Additionally, in this embodiment, there are spaces between the respective detection areas E11-E33, but these spaces may be eliminated. The detection areas adjacent to each other may be overlapped with each other. The shape of the detection area may take a shape of a circle, a polygon, etc. without being restricted to a rectangle.

Furthermore, in this embodiment, the movement detection circuit 122 detects a movement of the feature point between the current frame (k) and the frame immediately before (k−1), and the first clipping circuit 126 performs a clipping on the basis of the detection result. However, after the detecting processing by the movement detection circuit 122, the CPU 124 predicts the movement between the current frame (k) and the frame immediately after (k+1), and the first clipping circuit 126 may perform a clipping on the basis of the prediction result. In a case of FIG. 20 embodiment, the 3DDNR circuit 128 may also use the prediction result.

Moreover, in this embodiment, the FPN information is fixed, but the CPU 124 may always detect an FPN of the image sensor 114 through the FPN correction circuit 118a, and update the FPN information on the basis of the detection result, for example.

In the foregoing, the digital movie camera (100, 100A) is explained as one example, but the present invention can be applied to image processing apparatuses capable of processing a plurality of object scene images according to a time series captured by the image sensor. The image processing apparatuses in this case includes not only ones having the image sensor as a component (digital still camera, mobile terminal with camera, etc.) but also ones not having the image sensor as a component (personal computer, digital video reproducing device, etc. capable of capturing an object scene image taken by an external image sensor, for example).

Figure 23:
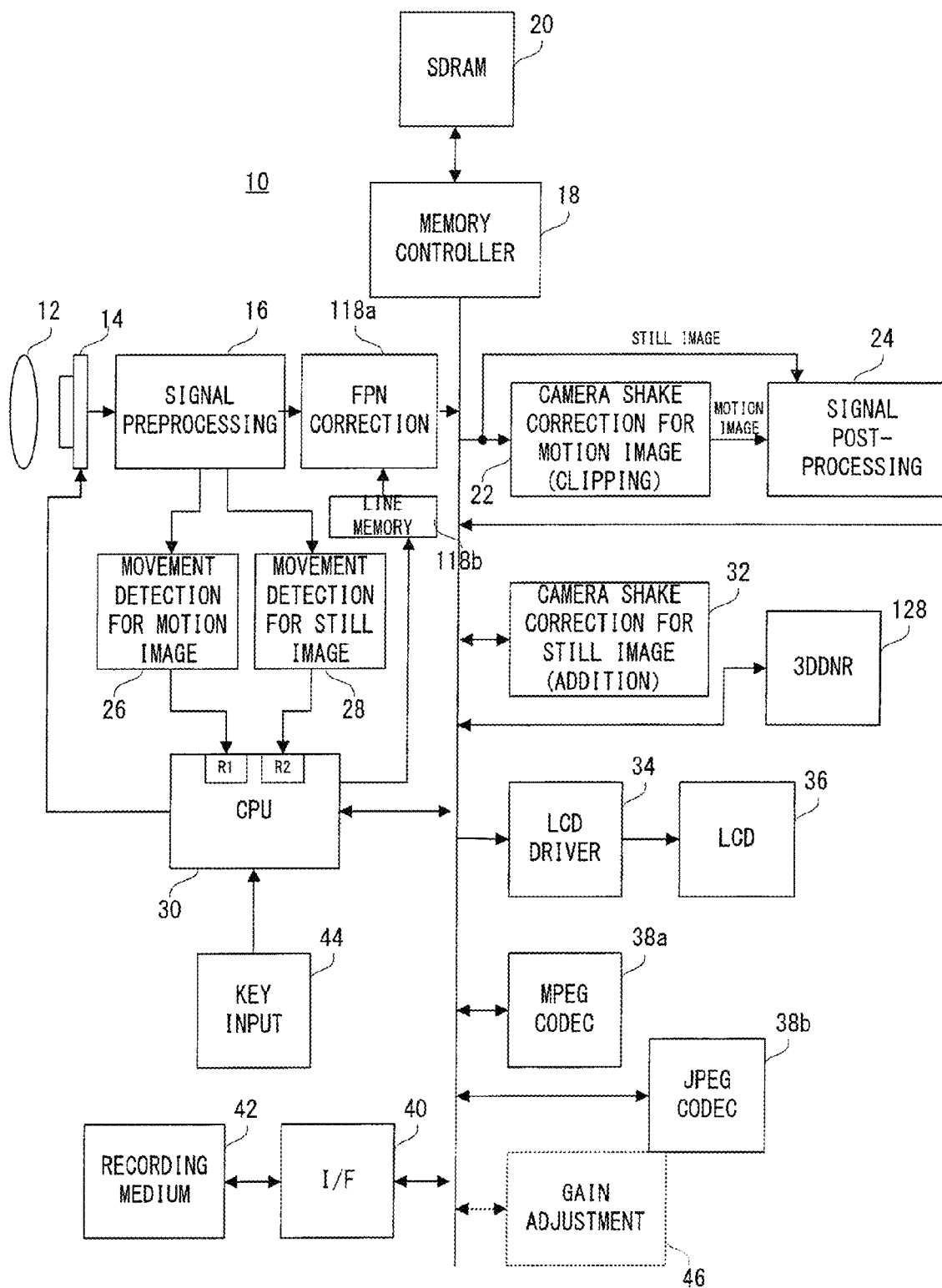
FIG. 23 is a block diagram showing a configuration of the modified example of the first embodiment.

For example, in a case that the invention is applied to the digital camera 10 of the first embodiment, the 3DDNR circuit 128 shown in FIG. 8 (or the 3DDNR circuit 128A in FIG. 20) is added to the digital camera 10 as shown in FIG. 23. The 3DDNR circuit 128 performs on each of the plurality of object scene images according to the time series after the clipping processing by the camera shake correction circuit for motion image 22 adding processing of displacing the object scene image immediately before the object image on the basis of the detection result by the movement detecting circuit for motion image 26 and adding them during the motion image shooting. Thus, it is possible to suppress the random noise included in each of the plurality of object scene images. Furthermore, in place of adding the 3DDNR circuit 128, the camera shake correction circuit for still image 32 may be worked as a 3DDNR circuit 128 during the motion image shooting period.

Furthermore, in FIG. 23 example, the FPN correction circuit 118a and the line memory 118b are added to the digital camera 10, and the CPU 30 repetitively determines whether or not the detection result of the movement detecting circuit for motion image 26 is above the threshold value during the motion image shooting (corresponding to the step S105 in FIG. 18), and if the determination result is affirmative, that is, if the detection result is above the threshold value, the FPN correction circuit 118a is made invalid (corresponding to the step S107) while if the determination result is negative, that is, if the detection result is not above the threshold value, the FPN correction circuit 118a is made valid (corresponding to the step S109).

In addition, the 3DDNR circuit 128 divides each of the pair of object scene images to be added to each other into the common partial images (B11-B66), and by assigning a weight with a coefficient for each common partial image and adding the resultants to each other, it is possible to avoid a blur at a portion with a large movement.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for performing image processing on a plurality of object scene images according to a time series that is output from an imager for repetitively capturing an optical image of an object scene, comprising:
    an FPN corrector for performing FPN correction processing on said plurality of object scene images;
    a movement detector for detecting a movement of a feature point among said plurality of object scene images;
    a first clipper for performing clipping processing on each of said plurality of object scene images at a position based on the detection result by said movement detector;
    an adder for performing adding processing of adding to each of said plurality of object scene images after said first clipper, one or plurality of object scene images temporally proximate to said object scene image;
    a first determiner for repetitively determining whether or not the movement detected by said movement detector is above a threshold value; and
    a first controller for making said FPN corrector invalid when the determination result by said first determiner is affirmative and making said FPN corrector valid when the determination result by said first determiner is negative.

2. An image processing apparatus according to claim 1, further comprising
    a first memory to which FPN information inherent to said imager is written, wherein
    said FPN corrector executes FPN correction processing on the basis of the FPN information stored in said first memory.

3. An image processing apparatus according to claim 2, wherein
    said FPN information includes size information indicating a size of the FPN, and said threshold value is a value in relation to said size information.

4. An image processing apparatus according to claim 3, wherein
said threshold value is larger than the value indicated by said size information.

5. An image processing apparatus according to claim 2, wherein
said FPN information includes presence or absence information indicating the presence or absence of an FPN, further comprising:
a second memory to which mode information indicating whether a camera shake correction mode is valid or invalid is written; and
an updater for updating the mode information stored in said second memory in response to a mode switching operation, wherein
said first determiner executes determining processing when the presence or absence information stored in said first memory indicates that an FPN is present, and the mode information stored in said second memory indicates that the camera shake correction is valid.

6. An image processing apparatus according to claim 5, wherein
said first controller makes said first clipper valid regardless of the determination result by said first determiner.

7. An image processing apparatus according to claim 5, further comprising
a second controller for making said FPN corrector valid and making said first clipper invalid when the presence or absence information stored in said first memory indicates that an FPN is present and the mode information stored in said second memory indicates that the camera shake correction mode is invalid.

8. An image processing apparatus according to claim 7, further comprising
a third controller for making said FPN corrector invalid and making said first clipper valid when the presence or absence information indicates that an FPN is absent and the mode information stored in said second memory indicates that the camera shake correction mode is valid.

9. An image processing apparatus according to claim 8, further comprising a fourth controller for making each of said FPN corrector and said first clipper invalid when the presence or absence information indicates that an FPN is absent and the mode information stored in said second memory indicates that the camera shake correction mode is invalid.

10. An image processing apparatus according to claim 9, further comprising
a second clipper for performing clipping processing on each of said plurality of object scene images at a fixed position, wherein
each of said first controller and said third controller further makes said second clipper invalid in response to the validating processing of said first clipper, and
each of said second controller and said fourth controller further makes said second clipper valid in response to the invalidating processing by said first clipper.

11. An image processing apparatus according to claim 1, wherein
said adder includes a divider for dividing a pair of object scene images to be added with each other into common partial images, and a weighted adder for weighing the division result by said divider with a coefficient for each common partial image and adding the results to each other.

12. An image processing apparatus according to claim 11, wherein
said detector assigns a plurality of detection areas to each of said plurality of object scene images, and performs a movement detection for each detection area,
said adder further includes a coefficient decider for deciding said coefficient for each common partial image, and
said coefficient decider for specifying detection areas corresponding to each common partial image out of said plurality of detection areas, and deciding the coefficient on the basis of the movement of the specified detection area out of the detection results by said detector.

13. An image processing apparatus according to claim 11, wherein
said adder further includes a difference calculator for calculating for each common partial image a difference between the division results by said divider, and a coefficient decider for deciding said coefficient for each common partial image, and
said coefficient decider performs a coefficient decision on the basis of the calculation result by said difference calculator.

14. An image processing apparatus according to claim 1, wherein
said imager includes a CMOS.

15. An image processing apparatus according to claim 1, further comprising said imager.

16. An image processing apparatus for performing image processing on a plurality of object scene images according to a time series that is output from an imager for repetitively capturing an optical image of an object scene, comprising:
a movement detector for detecting a movement of a feature point among said plurality of object scene images;
a first clipper for performing clipping processing on each of said plurality of object scene images at a position based on the detection result by said movement detector; and
an adder for performing adding processing of adding to each of said plurality of object scene images after said first clipper, one or plurality of object scene images temporally proximate to said object scene image, wherein
said adder includes a divider for dividing a pair of object scene images to be added with each other into common partial images, and a weighted adder for weighing the division result by said divider with a coefficient for each common partial image and adding the results to each other.

17. An image processing apparatus according to claim 16, wherein
said detector assigns a plurality of detection areas to each of said plurality of object scene images, and performs a movement detection for each detection area,
said adder further includes a coefficient decider for deciding said coefficient for each common partial image, and
said coefficient decider for specifying detection areas corresponding to each common partial image out of said plurality of detection areas, and deciding the coefficient on the basis of the movement of the specified detection area out of the detection results by said detector.

18. An image processing apparatus according to claim 16, wherein
said adder further includes a difference calculator for calculating for each common partial image a difference between the division results by said divider, and a coefficient decider for deciding said coefficient for each common partial image, and said coefficient decider performs a coefficient decision on the basis of the calculation result by said difference calculator.

19. An image processing apparatus according to claim 16, further comprising:
an FPN corrector for performing FPN correction processing on said plurality of object scene images;
a first determiner for repetitively determining whether or not the movement detected by said movement detector is above a threshold value; and
a first controller for making said FPN corrector invalid when the determination result by said first determiner is affirmative and making said FPN corrector valid when the determination result by said first determiner is negative.

20. An image processing apparatus according to claim 19, further comprising
a first memory to which FPN information inherent to said imager is written, wherein
said FPN corrector executes FPN correction processing on the basis of the FPN information stored in said first memory.

21. An image processing apparatus according to claim 20, wherein
said FPN information includes size information indicating a size of the FPN, and said threshold value is a value in relation to said size information.

22. An image processing apparatus according to claim 21, wherein
said threshold value is larger than the value indicated by said size information.

23. An image processing apparatus according to claim 22, wherein
said FPN information includes presence or absence information indicating the presence or absence of an FPN, further comprising:
a second memory to which mode information indicating whether a camera shake correction mode is valid or invalid is written; and
an updater for updating the mode information stored in said second memory in response to a mode switching operation, wherein
said first determiner executes determining processing when the presence or absence information stored in said first memory indicates that an FPN is present, and the mode information stored in said second memory indicates that the camera shake correction is valid.

24. An image processing apparatus according to claim 23, wherein
said first controller makes said first clipper valid regardless of the determination result by said first determiner.

25. An image processing apparatus according to claim 23, further comprising a second controller for making said FPN corrector valid and making said first clipper invalid when the presence or absence information stored in said first memory indicates that an FPN is present and the mode information stored in said second memory indicates that the camera shake correction mode is invalid.

26. An image processing apparatus according to claim 25, further comprising
a third controller for making said FPN corrector invalid and making said first clipper valid when the presence or absence information indicates that an FPN is absent and the mode information stored in said second memory indicates that the camera shake correction mode is valid.

27. An image processing apparatus according to claim 26, further comprising a fourth controller for making each of said FPN corrector and said first clipper invalid when the presence or absence information indicates that an FPN is absent and the mode information stored in said second memory indicates that the camera shake correction mode is invalid.

28. An image processing apparatus according to claim 27, further comprising
a second clipper for performing clipping processing on each of said plurality of object scene images at a fixed position, wherein
each of said first controller and said third controller further makes said second clipper invalid in response to the validating processing of said first clipper, and
each of said second controller and said fourth controller further makes said second clipper valid in response to the invalidating processing by said first clipper.

29. An image processing apparatus according to claim 16, wherein said imager includes a CMOS.

30. An image processing apparatus according to claim 16, further comprising said imager.

* * * * *